United States Patent
Takeda et al.

(10) Patent No.: US 11,579,396 B2
(45) Date of Patent: Feb. 14, 2023

(54) OPTICAL FIBER PROTECTIVE UNIT AND METHOD FOR PROTECTING OPTICAL FIBER

(71) Applicant: FUJIKURA LTD., Tokyo (JP)

(72) Inventors: Rikimaru Takeda, Chiba (JP); Norihiro Momotsu, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 17/278,025

(22) PCT Filed: Sep. 18, 2019

(86) PCT No.: PCT/JP2019/036613
§ 371 (c)(1),
(2) Date: Mar. 19, 2021

(87) PCT Pub. No.: WO2020/071125
PCT Pub. Date: Apr. 9, 2020

(65) Prior Publication Data
US 2021/0349280 A1    Nov. 11, 2021

(30) Foreign Application Priority Data
Oct. 4, 2018    (JP) .............................. JP2018-189402

(51) Int. Cl.
*G02B 6/44*    (2006.01)
*G02B 6/04*    (2006.01)

(52) U.S. Cl.
CPC .............. *G02B 6/4486* (2013.01); *G02B 6/04* (2013.01); *G02B 6/443* (2013.01)

(58) Field of Classification Search
CPC ................................................... G02B 6/4486
See application file for complete search history.

(56) References Cited

U.S. PATENT DOCUMENTS

| | | | | |
|---|---|---|---|---|
| 4,515,435 A | * | 5/1985 | Anderson | G02B 6/4429 385/103 |
| 5,133,583 A | * | 7/1992 | Wagman | G02B 6/4463 24/122.3 |
| 5,480,203 A | | 1/1996 | Favalora et al. | |
| 6,385,378 B1 | * | 5/2002 | Brown | G02B 6/4438 385/100 |
| 2001/0019122 A1 | * | 9/2001 | Mayr | H02G 1/081 254/134.3 FT |
| 2012/0189258 A1 | | 7/2012 | Overton et al. | |
| 2015/0125122 A1 | | 5/2015 | Winarski | |
| 2018/0058980 A1 | | 3/2018 | Babu et al. | |

FOREIGN PATENT DOCUMENTS

| | | |
|---|---|---|
| CN | 102239615 A | 11/2011 |
| CN | 104426093 A | 3/2015 |

(Continued)

*Primary Examiner* — Charlie Y Peng
(74) *Attorney, Agent, or Firm* — Osha Bergman Watanabe & Burton LLP

(57) ABSTRACT

An optical fiber protective unit includes: a reticulated tube having openings that are reticulately formed, the reticulated tube being configured to accommodate a plurality of optical fibers inserted through the reticulated tube; a tubular member disposed inside the reticulated tube, the tubular member being configured to accommodate the plurality of optical fibers through the tubular member; and a cylindrical member attached to an end part of the reticulated tube. The cylindrical member has an inner diameter that is larger than an outer diameter of the tubular member.

10 Claims, 20 Drawing Sheets

(56) References Cited

FOREIGN PATENT DOCUMENTS

| | | |
|---|---|---|
| CN | 108318986 A | 7/2018 |
| JP | S63049356 U | 4/1988 |
| JP | H05011720 U | 2/1993 |
| JP | H07281037 A | 10/1995 |
| JP | H10329215 A | 12/1998 |
| JP | 2000231047 A | 8/2000 |
| JP | 2002010441 A | 1/2002 |
| JP | 2003262771 A | 9/2003 |
| JP | 2004219502 A | 8/2004 |
| JP | 2010148335 A | 7/2010 |
| JP | 2010231047 A | 10/2010 |
| JP | 2011169939 A | 9/2011 |
| JP | 2013037253 A | 2/2013 |
| JP | 2013074717 A | 4/2013 |
| JP | 2013097320 A | 5/2013 |
| JP | 2013099074 A | 5/2013 |
| JP | 2015046971 A | 3/2015 |
| JP | 2015075639 A * | 4/2015 |
| JP | 2015075639 A | 4/2015 |
| JP | 2015232962 A | 12/2015 |
| JP | 2016221966 A | 12/2016 |
| JP | 2017215438 A | 12/2017 |
| JP | 2018049081 A | 3/2018 |
| TW | 201319653 A | 5/2013 |
| TW | 201821844 A | 6/2018 |
| WO | 2015053146 A1 | 4/2015 |

* cited by examiner

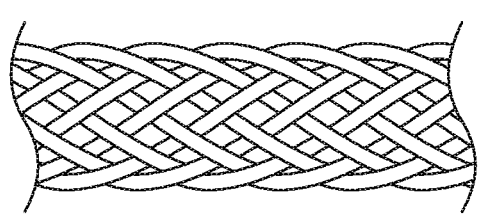
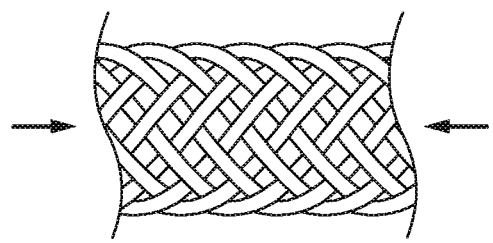
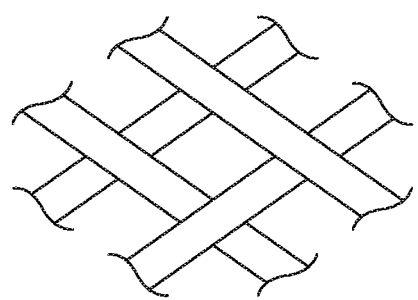
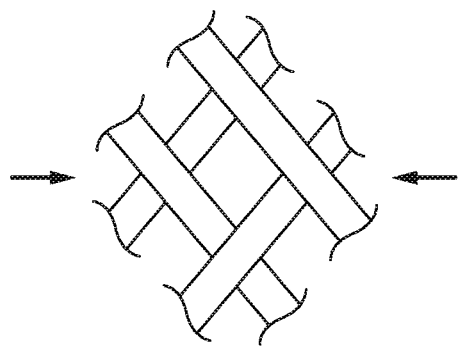
FIG. 7A					FIG. 7B

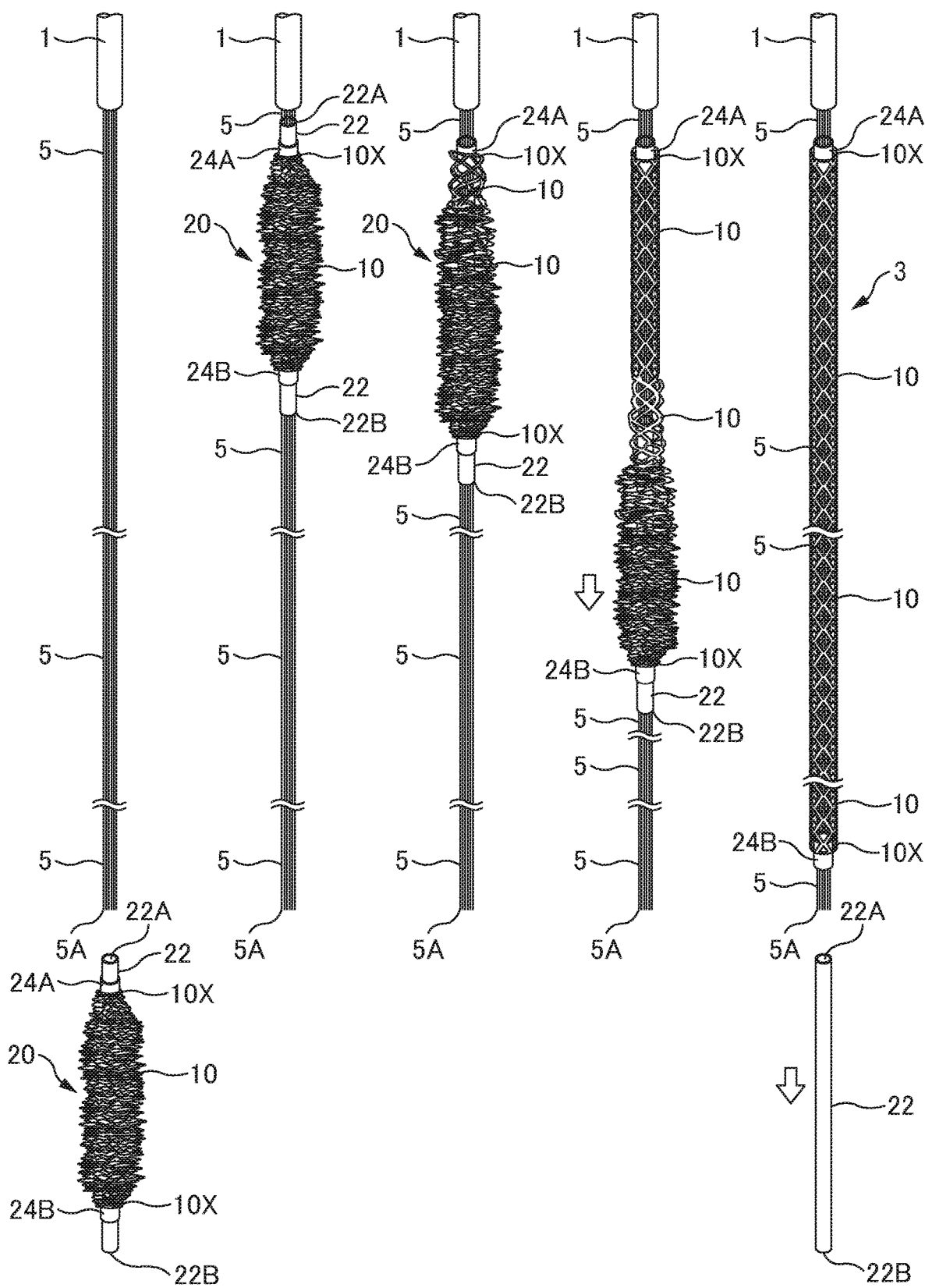

OPTICAL FIBER PROTECTIVE UNIT AND METHOD FOR PROTECTING OPTICAL FIBER

TECHNICAL FIELD

The present invention relates to an optical fiber protective unit and a method for protecting an optical fiber.

BACKGROUND

Patent Literatures 1 to 4 describe an optical fiber unit formed by wrapping a bundling member around a bundle of a plurality of optical fibers. Patent Literatures 3 and 4 describe a method for manufacturing an optical fiber unit by wrapping a bundling member around a bundle of a plurality of optical fibers.

Further, Patent Literatures 5 to 7 describe various tubes. Patent Literature 5 describes a protective tube that protects an optical fiber by covering an outer periphery of the optical fiber. Patent Literature 6 describes that a plastic line or a metal line is braided and formed into a cylindrical net capable of extension and contraction to protect wiring. Patent Literature 7 describes a net tube having a diameter enlarged when the net tube shrinks, and that the net tube protects an electric wire.

PATENT LITERATURE

Patent Literature 1: WO 2015/053146
Patent Literature 2: JP 2011-169939A
Patent Literature 3: JP 2013-97320A
Patent Literature 4: JP 2018-049081A
Patent Literature 5: JP 2017-215438A
Patent Literature 6: JPU 63 (1988)-49356A
Patent Literature 7: JP 2002-10441A The bundling member described in Patent Literatures 1 to 4 is wrapped around an outer periphery of a bundle of a plurality of optical fibers at a manufacturing factory in order to bind the plurality of optical fibers. Thus, the bundling member described in Patent Literatures 1 to 4 does not protect the optical fibers, and does not allow the optical fibers to be inserted therethrough. Further, the bundling member described in Patent Literatures 1 to 4 is not assumed to be attached to an outer periphery of a bundle of optical fibers when the optical fibers are laid at a laying site (it should be noted that it is difficult to attach the bundling member described in Patent Literatures 1 to 4 to an outer periphery of a bundle of optical fibers when the optical fibers are laid at a laying site).

Further, in a case of the protective tube described in Patent Literature 5 and a spiral tube described in the prior art in Patent Literature 6, work for inserting optical fibers takes time and effort. In a case of a braided tube (tube constituted by braiding a wire rod) described in Patent Literatures 6 and 7, the amount of extension and contraction in a longitudinal direction is small, and work for inserting optical fibers also takes time and effort in this case. In addition, when optical fibers are inserted through the braided tube having the diameter changed during extension and contraction, a diameter becomes thin when the braided tube is extended in the longitudinal direction. Thus, pressure is applied to the optical fibers inserted through the inside, and a transmission loss of the optical fibers increases.

SUMMARY

One or more embodiments of the present invention provide an optical fiber protective unit including a reticulated tube in which work for protecting an optical fiber when the optical fiber is laid is easy, and facilitating handling of the reticulated tube.

One or more embodiments of the present invention is an optical fiber unit including a reticulated tube in which openings are reticulately formed, the reticulated tube being configured to be inserted with a plurality of optical fibers through the reticulated tube; a tubular member inserted through the reticulated tube, the tubular member being configured to be inserted with the plurality of optical fibers through the tubular member; and a cylindrical member attached to an end part of the reticulated tube.

Other features of embodiments of the invention are made clear by the following description and the drawings.

With embodiments of the present invention, a reticulated tube having a great amount of extension and contraction in a longitudinal direction protects an optical fiber, and thus work for protecting the optical fiber when the optical fiber is laid is facilitated. Since a tubular member is inserted through the reticulated tube and a cylindrical member, work for inserting the optical fiber through the reticulated tube is facilitated.

BRIEF DESCRIPTION OF DRAWINGS

FIG. 7A is an explanatory diagram of a shape of a braided tube according to a comparative example. FIG. 7B is an enlarged explanatory diagram of the vicinity of a mesh of the braided tube according to the comparative example.

FIG. 11 FIGS. 11A to 11E are explanatory diagrams of a method for protecting optical fibers 5 by using the protective unit 20.

DETAILED DESCRIPTION

Figure 1A:
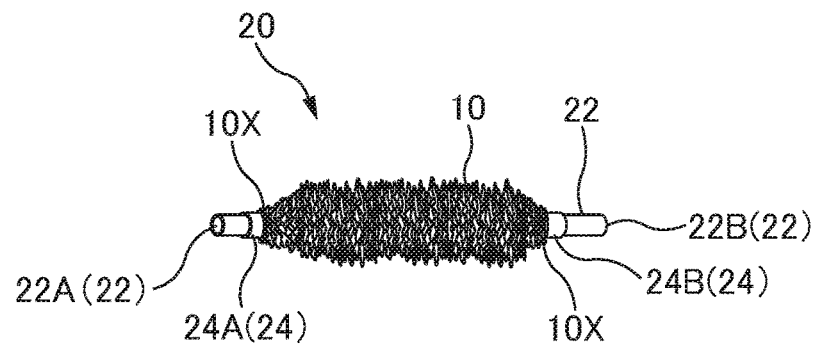
FIG. 1A is an explanatory diagram of a protective unit 20 according to one or more embodiments.

At least the following matters are made clear from the following description and the drawings.

Disclosed is an optical fiber unit including a reticulated tube in which openings are reticulately formed, the reticulated tube being configured to be inserted with a plurality of optical fibers through the reticulated tube; a tubular member inserted through the reticulated tube, the tubular member being configured to be inserted with the plurality of optical fibers through the tubular member; and a cylindrical member attached to an end part of the reticulated tube. With this optical fiber protective unit, the reticulated tube having a great amount of extension and contraction in a longitudinal direction protects the optical fiber, and thus work for protecting the optical fiber when the optical fiber is laid is facilitated. Since the tubular member is inserted through the reticulated tube, work for inserting the optical fiber through the reticulated tube is facilitated. Furthermore, since the cylindrical member is attached to the end part of the reticulated tube, the reticulated tube is easily pulled out of the tubular member in this configuration.

In one or more embodiments, the reticulated tube is folded in a longitudinal direction by bending a peripheral part of the opening. In this way, the amount of extension and contraction in the longitudinal direction of the reticulated tube increases.

In one or more embodiments, the reticulated tube in a folded state is extendable in a longitudinal direction by pulling out the cylindrical member from the tubular member. In this way, work for protecting an optical fiber when the optical fiber is laid is facilitated.

In one or more embodiments, the reticulated tube includes a plurality of first wire rods disposed in a spiral shape in a predetermined direction, and a plurality of second wire rods disposed in a direction different from the first wire rods, and an intersection point of the first wire rod and the second wire rod is bonded. In this way, it is possible to easily manufacture the reticulated tube.

In one or more embodiments, the intersection point of the first wire rod and the second wire rod is fusion-bonded. In this way, it is possible to easily manufacture the reticulated tube.

In one or more embodiments, the cylindrical member and the end part of the reticulated tube are fusion-bonded. In this way, it is possible to easily attach the end part of the reticulated tube to the cylindrical member.

In one or more embodiments, the cylindrical member includes a hollow cylindrical part, and a protrusion part protruding outward from an outer periphery of the hollow cylindrical part. In this way, the work for protecting an optical fiber when the optical fiber is laid is facilitated.

In one or more embodiments, the end part of the reticulated tube is hooked on the protrusion part. In this way, the end part of the reticulated tube is easily attached to the cylindrical member.

In one or more embodiments, the protrusion part has irregularities formed on an edge of the protrusion part. In this way, the end part of the reticulated tube is easily hooked on the protrusion part.

In one or more embodiments, the protrusion part is configured to be inserted into a groove of another member (i.e., an external member), and the end part of the reticulated tube is fixed to the another member by inserting the protrusion part into the groove. In this way, the end part of the reticulated tube is easily fixed to another member.

Disclosed is a method for protecting an optical fiber including preparing a protective unit including a reticulated tube folded in a longitudinal direction, a tubular member inserted through the reticulated tube, and a cylindrical member attached to an end part of the reticulated tube, inserting a plurality of optical fibers through the inside of the reticulated tube in a folded state by inserting the optical fibers into the tubular member, and extending the reticulated tube in the folded state in the longitudinal direction by pulling out the cylindrical member from the tubular member, and inserting the plurality of optical fibers through the inside of the extended reticulated tube. With this method for protecting an optical fiber, the reticulated tube having a great amount of extension and contraction in a longitudinal direction protects the optical fiber, and thus work for protecting the optical fiber when the optical fiber is laid is facilitated. Since the tubular member is inserted through the reticulated tube and the cylindrical member, work for inserting the optical fiber through the reticulated tube is facilitated.

{Protective Unit 20}

Figure 1B:
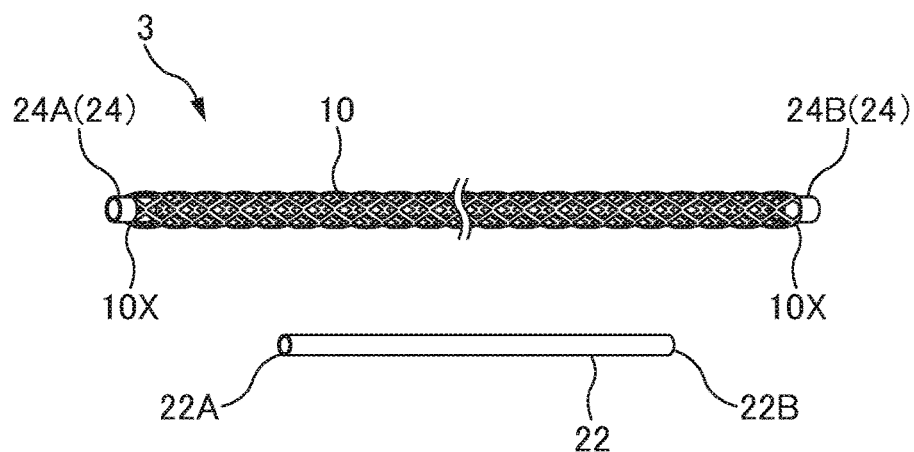
FIG. 1B is an exploded explanatory diagram of the protective unit 20 according to one or more embodiments.
Figure 1C:
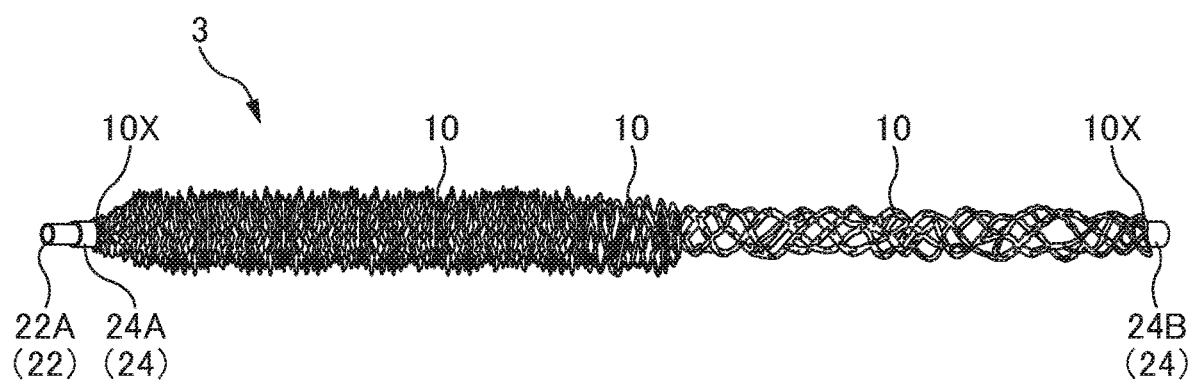
FIG. 1C is an explanatory diagram of a state in which a cylindrical member 24 is removed from a tubular member 22, and a reticulated tube 10 is extended.

Basic Structure of Protective Unit 20:

FIG. 1A is an explanatory diagram of a protective unit 20 according to one or more embodiments. FIG. 1B is an exploded explanatory diagram of the protective unit 20 according to one or more embodiments. FIG. 1C is an explanatory diagram of a state in which a cylindrical member 24 (second cylindrical member 24B) is removed from a tubular member 22, and a reticulated tube 10 is extended.

The protective unit 20 is a member for inserting optical fibers 5 through the reticulated tube 10, and protecting the optical fibers 5. The protective unit 20 includes the reticulated tube 10, the tubular member 22 (pipe member), and the cylindrical member 24 (ring member).

Reticulated Tube 10

Figure 2A:
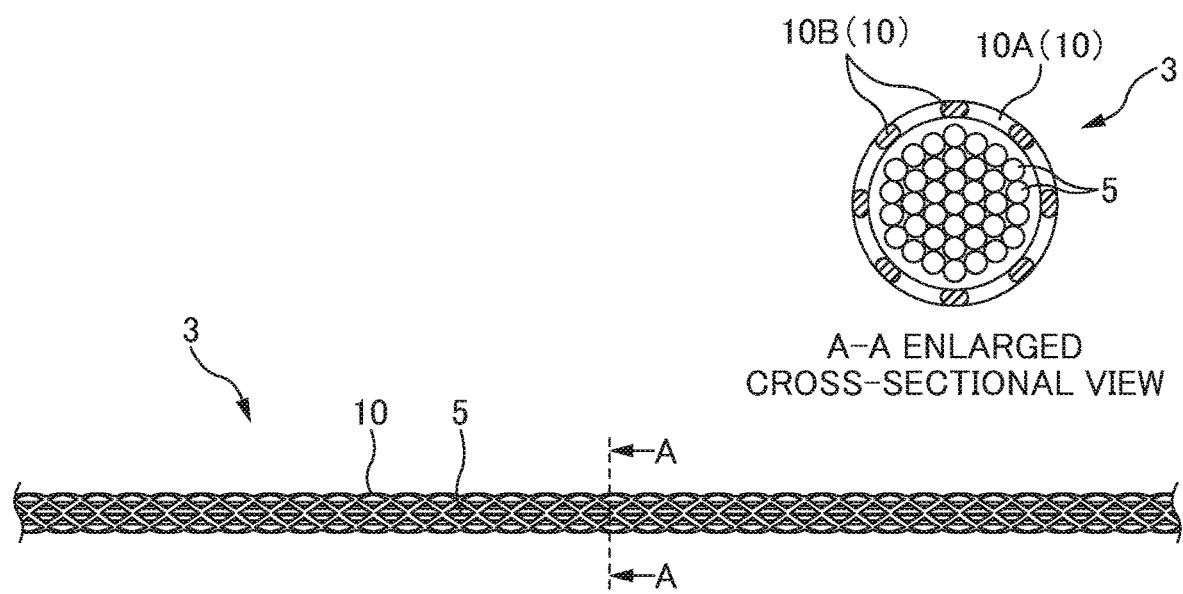
FIGS. 2A and 2B are explanatory diagrams of the reticulated tube 10.
Figure 2B:
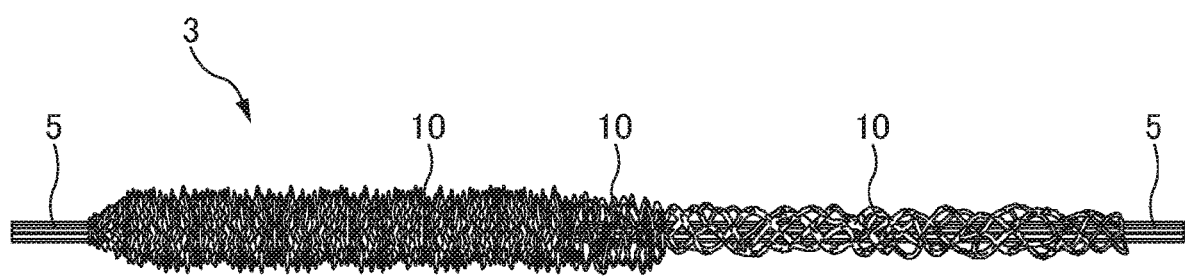

FIGS. 2A and 2B are explanatory diagrams of the reticulated tube 10. FIG. 2A illustrates the reticulated tube 10 in an extended state. FIG. 2A also illustrates an enlarged cross-sectional view in an A-A cross section. FIG. 2B illustrates the reticulated tube 10 in a folded state. It should be noted that FIGS. 2A and 2B illustrate a state in which the optical fibers 5 are inserted through the inside of the reticulated tube 10.

The reticulated tube 10 is a cylindrical member in which many openings 10A (meshes) are reticulately formed. Meshes are formed in the reticulated tube 10 by forming many openings 10A. The reticulated tube 10 is configured to be foldable in a longitudinal direction by bending a peripheral part 10B around the opening 10A (peripheral part 10B surrounding the opening 10A). In one or more embodiments, a length of the reticulated tube 10 after contracting in the longitudinal direction can be less than or equal to 10% of a length of the reticulated tube 10 in an initial state (extended state) before the contraction.

The plurality of optical fibers 5 are inserted through the inside of the reticulated tube 10, and thus the optical fibers 5 are protected. Thus, the reticulated tube 10 is a protective tube that protects the optical fibers 5. In the following description, the reticulated tube 10 through which the plurality of optical fibers 5 are inserted may be referred to as an "optical fiber unit 3".

Figure 3A:
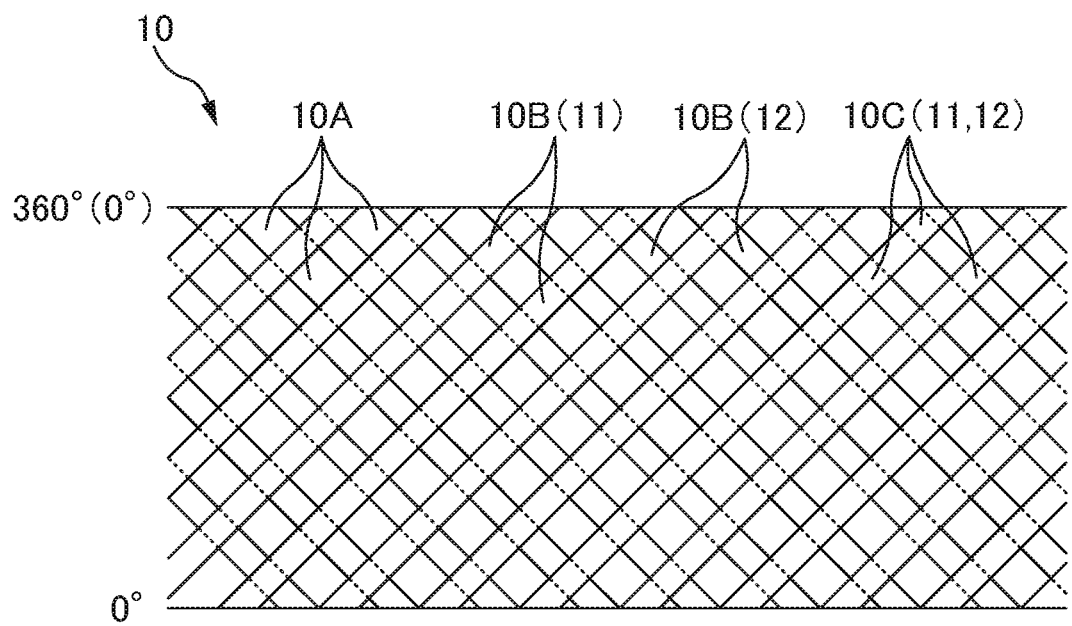
FIG. 3A is a developed view for illustrating a shape of the reticulated tube 10.
Figure 3B:
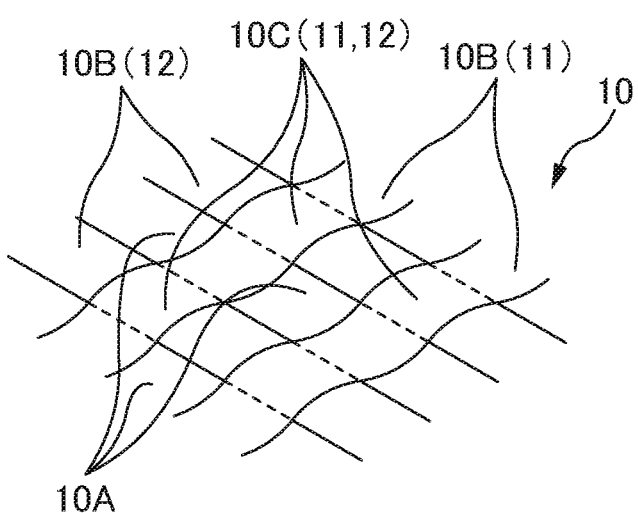
FIG. 3B is an enlarged perspective view of the reticulated tube 10 illustrated in FIG. 3A.

FIG. 3A is a developed view for illustrating a shape of the reticulated tube 10. FIG. 3A illustrates the reticulated tube 10 on a cylindrical coordinate system on the assumption that the reticulated tube 10 that is not bent is virtually disposed on a cylindrical plane. A horizontal axis in the diagram indicates a position in the longitudinal direction. A vertical axis indicates an angle from a reference position (0 degree), and indicates a position in a circumferential direction on the cylindrical plane. FIG. 3B is an enlarged perspective view of the reticulated tube 10 illustrated in FIG. 3A.

Each opening 10A (mesh) is surrounded by at least two peripheral parts 10B, and constitutes a hole penetrating in a radial direction of the reticulated tube 10. Each peripheral part 10B is a linear (including band-shaped and string-shaped) section that surrounds the opening 10A. The peripheral part 10B is present between the opening 10A and the opening 10A. The peripheral part 10B may be referred to as a "strand". A branch part 10C is formed in a boundary of three or more openings 10A. Three or more peripheral parts 10B extend from the branch part 10C. In a case of the reticulated tube 10 illustrated in FIG. 3A, the branch part 10C is formed in a boundary of four openings 10A, and four peripheral parts 10B extend from the branch part 10C. The branch part 10C may be referred to as a "bridge".

In one or more embodiments, a plurality of first wire rods 11 formed in a spiral shape in a predetermined direction (S direction) and a plurality of second wire rods 12 formed in a spiral shape in a reverse direction (Z direction) of the first wire rods 11 form the reticulated tube 10. It should be noted that four first wire rods 11 and four second wire rods 12 form the reticulated tube 10 in one or more embodiments, but the number of the wire rods is not limited thereto. The peripheral part 10B according to one or more embodiments is constituted by the wire rod. The branch part 10C is constituted by an intersection point of the two wire rods. In one or more embodiments, the intersection point of the two wire rods is bonded (i.e., the branch part 10C according to one or more embodiments is a bonding part of the two wire rods). It should be noted that, in one or more embodiments, the intersection point of the two wire rods is fusion-bonded.

In one or more embodiments, as illustrated in FIG. 3B, the two wire rods are bonded to each other in an overlapping manner in the branch part 10C. In other words, in one or more embodiments, the branch part 10C has a double-layer structure of the two wire rods being bonded together, and has strength higher than that of the peripheral part 10B (wire rod) except for the branch part 10C having a single-layer structure. Thus, in one or more embodiments, the peripheral part 10B except for the branch part 10C is more easily bent than the branch part 10C.

In one or more embodiments, as illustrated in FIG. 3B, the two wire rods intersect each other such that the wire rod (first wire rod 11) in the S direction is disposed on the wire rod (second wire rod 12) in the Z direction in the branch part 10C. In other words, in one or more embodiments, the wire rod (first wire rod 11) in the S direction and the wire rod (second wire rod 12) in the Z direction are not braided. In this way, the reticulated tube 10 can be manufactured more easily than when wire rods in two directions are braided (when the first wire rod 11 in the S direction and the second line in the Z direction alternately intersect each other).

Figure 4A:
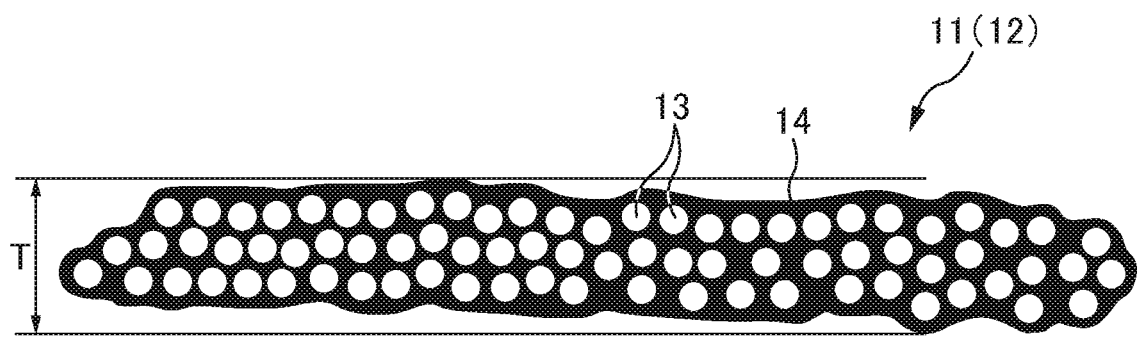
FIG. 4A is a cross-sectional view of a wire rod according to one or more embodiments.

FIG. 4A is a cross-sectional view of a wire rod according to one or more embodiments. The wire rod includes a plurality of core parts 13 and a sheath part 14. Each core part 13 is a fibrous member (core material) extending in the longitudinal direction (longitudinal direction of the wire rod). The sheath part 14 is a sheath member that covers an outer periphery of the plurality of core parts 13. A melting point of the sheath part 14 is lower than a melting point of the core part 13. At the time of manufacturing of the wire rod according to one or more embodiments, the wire rod is formed by bundling many fibers having the core material (core part 13) covered with the sheath part 14, and integrally fusing many fibers while extending many fibers at a temperature higher than or equal to the melting point of the sheath part 14 and lower than the melting point of the core part 13. At the time of manufacturing of the reticulated tube 10, both the wire rod (first wire rod 11) in the S direction and the wire rod (second wire rod 12) in the Z direction are heat-sealed in the intersection point of the wire rod in the S direction and the wire rod in the Z direction by being heated at a temperature higher than or equal to the melting point of the sheath part 14 and lower than the melting point of the core part 13. Since the melting point of the core part 13 is higher than the melting point of the sheath part 14, the core part 13 can be less likely to be melted even when the sheath part 14 is heated to higher than or equal to the melting point of the sheath part 14, and thus strength of the wire rod (peripheral part 10B) after fusion splicing can be maintained.

Figure 4B:
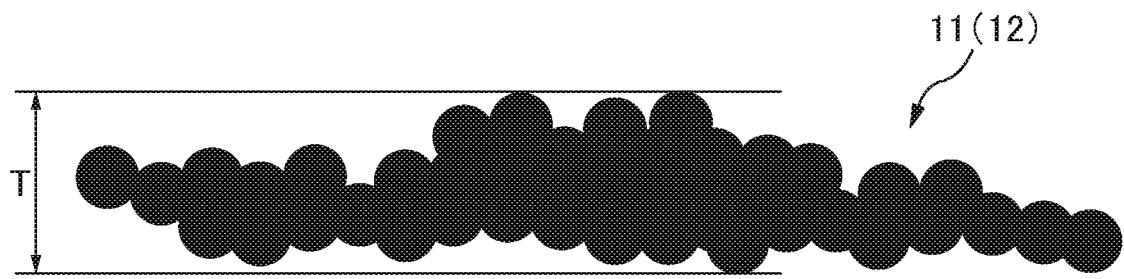
FIGS. 4B and 4C are cross-sectional views of another wire rod.
Figure 4C:

It should be noted that the wire rod may be constituted by a single material instead of a composite material as illustrated in FIG. 4A. A wire rod illustrated in FIG. 4B is formed by integrally fusing fibers formed of a core material without a sheath. A wire rod illustrated in FIG. 4C is formed in a film shape instead of fusing a fibrous member. As illustrated in FIGS. 4B and 4C, the wire rod (peripheral part 10B) may be constituted by a single material. In the following description, the structure illustrated in FIG. 4A may be referred to as a "double-layer monofilament", the structure illustrated in FIG. 4B may be referred to as a "single-layer monofilament", and the structure illustrated in FIG. 4C may be referred to as a "film".

As described later, it is desirable that the wire rod has plasticity. In this way, the reticulated tube 10 can be constituted such that the peripheral part 10B has shape retention in a bent state. It should be noted that, when the wire rod is constituted by a double-layer monofilament in which, for example, the core part 13 is polyester and the sheath part 14 is polypropylene, the reticulated tube 10 can be constituted such that the peripheral part 10B has shape retention in a bent shape. However, as long as the reticulated tube 10 can be constituted such that the peripheral part 10B has shape retention in a bent state, a material of the wire rod is not limited thereto. The wire rod may be constituted by another organic material by, for example, using a material other than polyester for the core part 13 and using a material other than polypropylene for the sheath part 14. The wire rod may not be constituted by a double-layer monofilament, and may be constituted by a material other than an organic material.

In one or more embodiments, the peripheral part 10B is formed in a tape shape (a band shape and a flat shape) as illustrated in FIGS. 4A to 4C. In this way, in one or more embodiments, the peripheral part 10B is easily bent such that a mountain fold and a valley fold are formed on a tape surface.

Figure 5A:
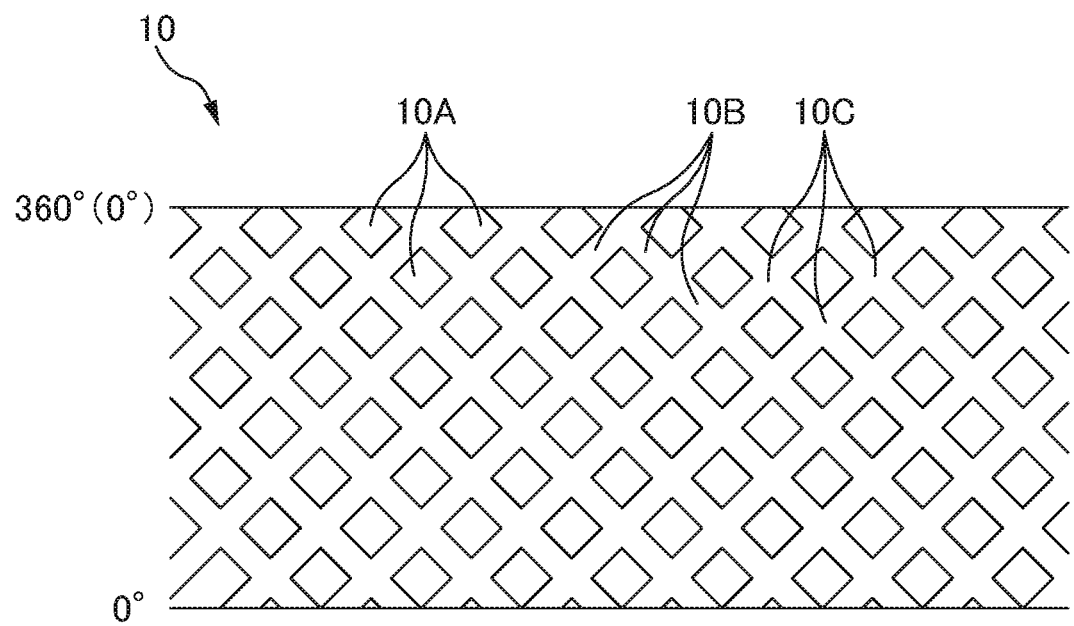
FIG. 5A is a developed view for illustrating another shape of the reticulated tube 10.
Figure 5B:
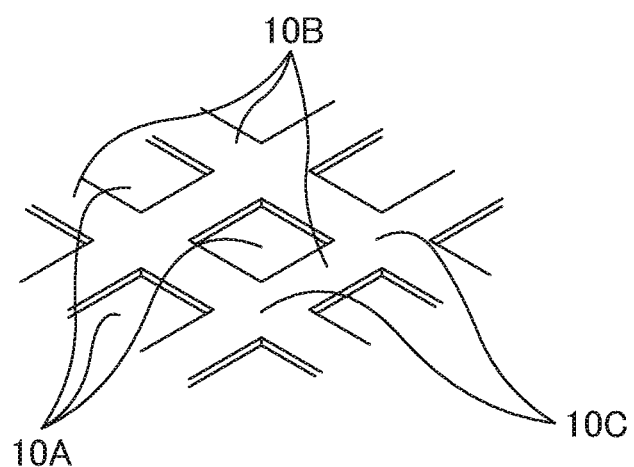
FIG. 5B is an enlarged perspective view of the reticulated tube 10 illustrated in FIG. 5A.

FIG. 5A is a developed view for illustrating another shape of the reticulated tube 10. FIG. 5B is an enlarged perspective view of the reticulated tube 10 illustrated in FIG. 5A. The above-described reticulated tube 10 is constituted by bonding the wire rods in the S direction and the Z direction together (cf. FIGS. 3A and 3B), whereas the reticulated tube 10 here is constituted as one cylindrical member in which many openings 10A are formed. In this way, the branch part 10C may not be a bonding part.

Figure 6A:
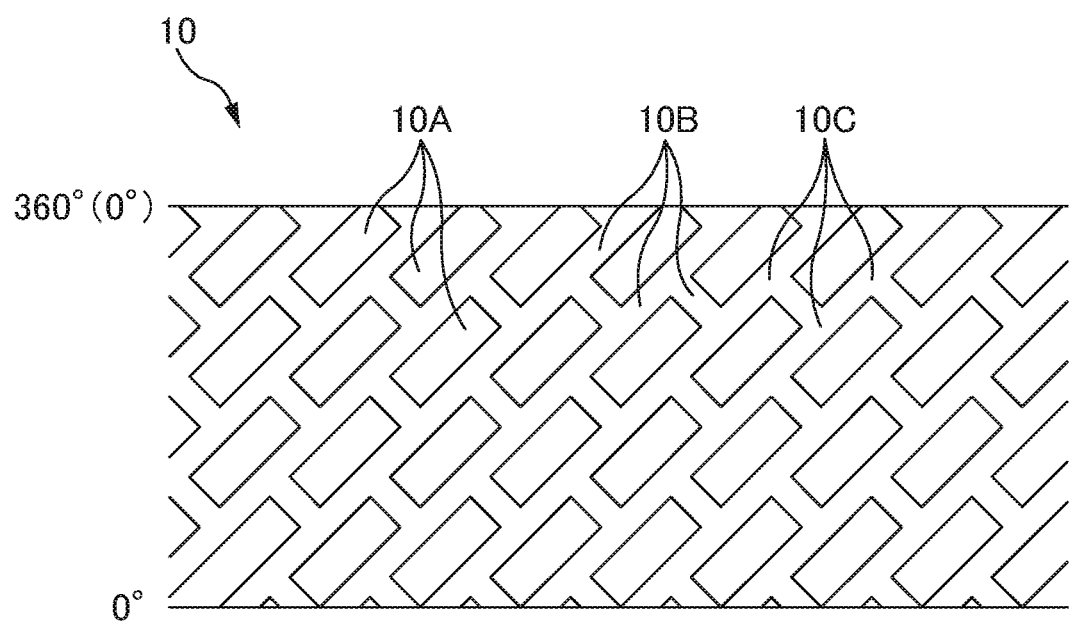
FIGS. 6A and 6B are developed views for illustrating still another shape of the reticulated tube 10.
Figure 6B:
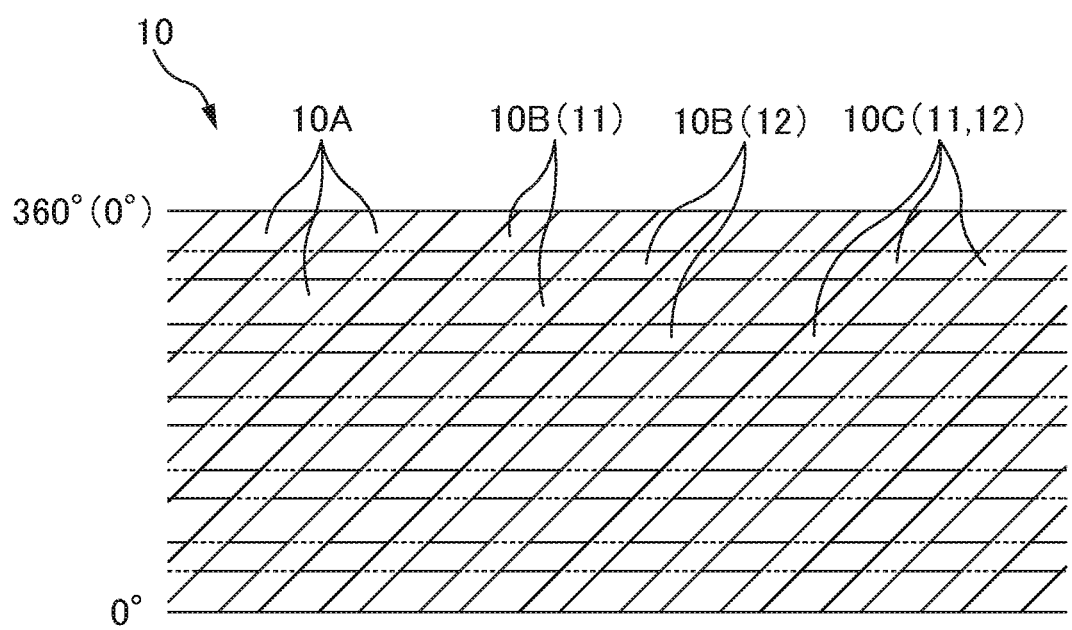

FIGS. 6A and 6B are developed views for illustrating still another shape of the reticulated tube 10. In a case of the reticulated tube 10 illustrated in FIG. 6A, the linear peripheral parts 10B do not intersect each other, and three peripheral parts 10B extend in a T shape from the branch part 10C. In this way, two linear peripheral parts 10B may not intersect each other. In the reticulated tube 10 illustrated in FIG. 6B, a plurality of first wire rods 11 formed in a spiral shape in a predetermined direction (S direction) and a plurality of second wire rods 12 disposed along the longitudinal direction (aligned vertically) form the reticulated tube 10. In this way, when the reticulated tube 10 is formed by bonding an intersection point of two wire rods, all wire rods may not be disposed in a spiral shape.

It should be noted that a shape of the opening 10A may not be a square and a rectangle, and may be a rhombus and a parallelogram. A shape of the opening 10A may not be a quadrilateral, and may be another polygon. A shape of the opening 10A is not limited to a polygon, and may be a circle and an ellipse. The opening 10A may be formed in a slit shape having no predetermined area.

FIG. 7A is an explanatory diagram of a shape of a braided tube according to a comparative example. FIG. 7B is an enlarged explanatory diagram of the vicinity of a mesh of the braided tube according to the comparative example. The braided tube according to the comparative example is formed by braiding wire rods into a tube shape. Since an intersection point of the wire rods is not bonded, an angle at which the wire rods intersect each other is variable. In a case of such a braided tube, the wire rods extend and contract in the longitudinal direction by changing an intersection angle of the wire rods without bending the wire rods. Thus, the amount of extension and contraction of the braided tube in the longitudinal direction is relatively small. In a case of the braided tube, an intersection angle of the wire rods changes for extension and contraction, and thus a diameter of a tube changes. Thus, when the braided tube is extended, an inner diameter of the braided tube becomes thin, and thus pressure is applied to the optical fibers 5 inserted through the inside, and a transmission loss of the optical fibers 5 may increase.

Figure 8A:
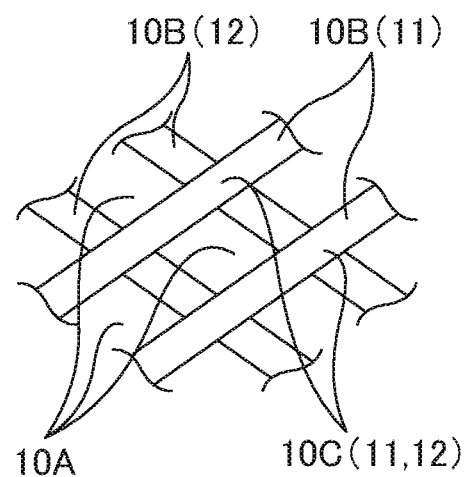
FIGS. 8A and 8B are explanatory diagrams of a state before and after extension and contraction in the vicinity of an opening 10A (mesh) of the reticulated tube 10 according to one or more embodiments.
Figure 8B:
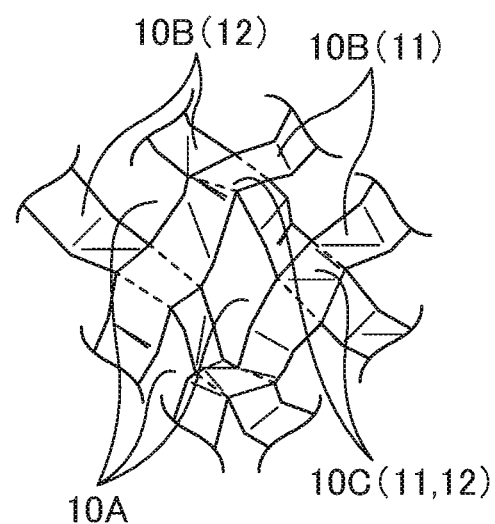

FIGS. 8A and 8B are explanatory diagrams of a state before and after extension and contraction in the vicinity of the opening 10A (mesh) of the reticulated tube 10 according to one or more embodiments. In one or more embodiments, when the reticulated tube 10 contracts in the longitudinal direction (cf. FIG. 2B), as illustrated in FIG. 8B, the peripheral part 10B of the opening 10A is bent and folded in the longitudinal direction. The reason is that, in one or more embodiments, the peripheral part 10B is restricted (bonded) by the branch part 10C, and an intersection angle of the wire rods is not variable as in the comparative example. The bent peripheral part 10B is not only displaced within a cylindrical peripheral surface of the reticulated tube 10 before deformation, but is also displaced in a radial direction. As a result, in one or more embodiments, the amount of contraction in the longitudinal direction greatly increases further than that of the braided tube according to the comparative example. It should be noted that, in one or more embodiments, a length of the reticulated tube 10 after contracting in the longitudinal direction can be less than or equal to 10% of a length of the reticulated tube 10 in an initial state (expansion state) before the contraction (in contrast, the braided tube according to the comparative example illustrated in FIG. 7B cannot contract to a 1/10 length of an initial state in a contraction mechanism of the braided tube).

In one or more embodiments, the peripheral part 10B is restricted (bonded) by the branch part 10C, and an intersection angle of the wire rods is not variable in contrast to the comparative example, and thus an inner diameter of the reticulated tube 10 excessively becoming thin when the reticulated tube 10 is extended can be suppressed. Thus, when the reticulated tube 10 in a folded state is extended, pressure applied to the optical fibers 5 inserted through the inside can be suppressed, and a transmission loss of the optical fibers 5 can be suppressed.

Since the peripheral part 10B is formed in a tape shape (a band shape and a flat shape) (cf. FIG. 4A) in one or more embodiments, the peripheral part 10B is easily bent such that a mountain fold and a valley fold are formed on a tape surface. Thus, the bent peripheral part 10B is more likely to be displaced in the radial direction, and the amount of contraction in the longitudinal direction can extremely increase. In addition, since strength of the peripheral part 10B (single-layer structure) except for the branch part 10C is lower than that of the branch part 10C (double-layer structure) in one or more embodiments, the peripheral part 10B can be guided to be bent such that a mountain fold and a valley fold are formed on a tape surface (such that a tape surface is displaced in the radial direction) when the reticulated tube 10 is folded in the longitudinal direction.

In one or more embodiments, the peripheral part 10B has plasticity, is plastically deformed in a bent state of the peripheral part 10B, and is held in a bent shape. In other words, in one or more embodiments, the peripheral part 10B has shape retention in a bent state. In this way, in one or more embodiments, a shape of the reticulated tube 10 can be held in a state in which the reticulated tube 10 contracts in the longitudinal direction as illustrated in FIG. 1A. In one or more embodiments, the peripheral part 10B in a bent state can be extended to an original state. In this way, in one or more embodiments, the reticulated tube 10 can be extended in the longitudinal direction as illustrated in FIGS. 1C and 2A from a state in which the reticulated tube 10 is contracted in the longitudinal direction (cf. FIG. 1A). It should be noted that, in one or more embodiments, work for inserting the optical fibers 5 through the reticulated tube 10 is facilitated by using the property of extending the peripheral part 10B in a bent state to an original state.

Tubular Member 22

The tubular member 22 (cf. FIGS. 1A to 1C) is a hollow cylindrical member (pipe), and allows a bundle of the optical fibers 5 to be inserted through the inside. In the following description, one end part of the tubular member 22 may be referred to as a "first end 22A", and the other end part may be referred to as a "second end 22B". The reticulated tube 10 folded in the longitudinal direction is disposed on an outer periphery of the tubular member 22. A pair of cylindrical members 24 (rings) are disposed on the outer periphery of the tubular member 22.

The tubular member 22 is inserted through the folded reticulated tube 10. In other words, a section of the reticulated tube 10 of the protective unit 20 has a double-tube structure in which the tubular member 22 is disposed inside and the folded reticulated tube 10 is disposed on the outer periphery of the tubular member 22. The tubular member 22 is disposed inside the reticulated tube 10, and thus an end part 5A of the optical fiber 5 is not caught on the reticulated tube 10 when the optical fibers 5 are inserted through the reticulated tube 10. Thus, the tubular member 22 serves as a jig for inserting the optical fibers 5 through the reticulated tube 10. It should be noted that, since a bundle of the plurality of optical fibers 5 are inserted through the folded reticulated tube 10 (described later) in one or more embodiments, it is especially advantageous to dispose the tubular member 22 inside the reticulated tube 10.

The tubular member 22 is longer than the folded reticulated tube 10. Both ends of the tubular member 22 extend from the end parts 10X on both sides of the folded reticulated tube 10.

Cylindrical Member 24

The cylindrical member 24 (cf. FIGS. 1A to 1C) is a hollow cylindrical member (ring) shorter than the tubular member 22, and is configured to be inserted with a bundle of the optical fibers 5 and the tubular member 22 through the cylindrical member. Thus, the cylindrical member 24 together with the tubular member 22 serve as a jig for inserting the optical fibers 5 through the reticulated tube 10. An inner diameter of the cylindrical member 24 is larger than an outer diameter of the tubular member 22. Thus, the cylindrical member 24 can slide in the longitudinal direction of the tubular member 22 while the tubular member 22 is inserted through the inside of the cylindrical member 24. A section of the protective unit 20 on which the cylindrical member 24 is disposed has a double-tube structure in which the tubular member 22 is disposed inside and the cylindrical member 24 is disposed on the outer periphery of the tubular member 22. The cylindrical member 24 can be removed from the tubular member 22 by sliding the cylindrical member 24 of the protective unit 20.

The cylindrical member 24 is attached to each of both ends of the reticulated tube 10. Thus, the protective unit 20 includes the pair of cylindrical members 24. In the following description, one of the cylindrical members 24 may be referred to as a "first cylindrical member 24A", and the other cylindrical member 24 may be referred to as a "second cylindrical member 24B". The reticulated tube 10 in a folded state can be extended on the outer periphery of the tubular member 22 by removing the cylindrical member 24 from the tubular member 22 (cf. FIG. 1C).

In the state illustrated in FIG. 1, an interval between the first cylindrical member 24A and the second cylindrical member 24B is shorter than the tubular member 22. The first end 22A of the tubular member 22 extends from the end part outside the first cylindrical member 24A, and the second end 22B of the tubular member 22 extends from the end part outside the second cylindrical member 24B. In this way, the optical fibers 5 can be inserted through the cylindrical members 24 (the first cylindrical member 24A and the second cylindrical member 24B) and the reticulated tube 10 by inserting the optical fibers 5 into the tubular member 22.

Figure 9:
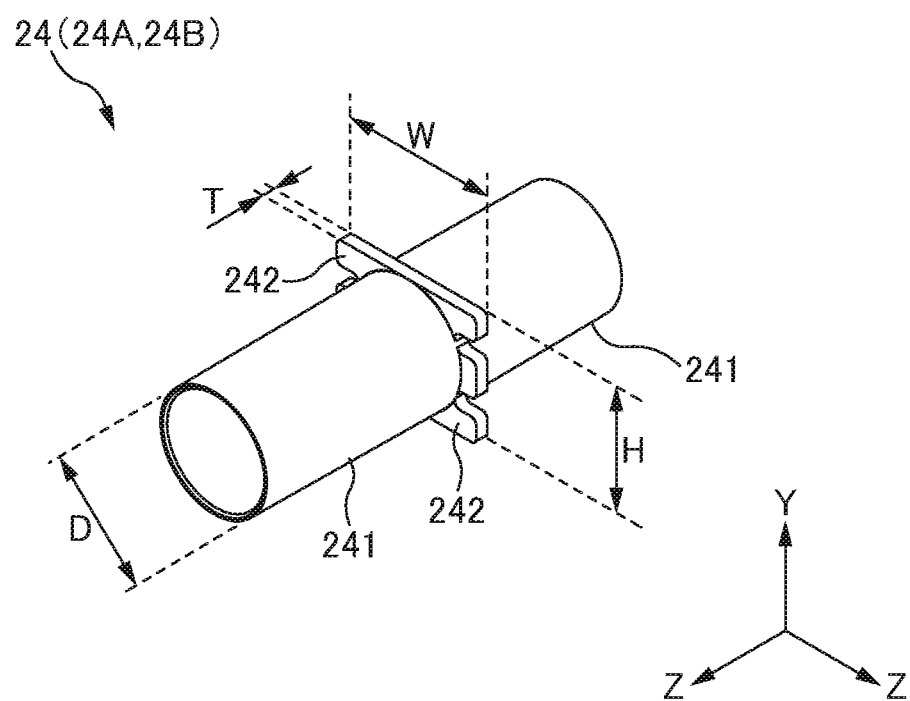
FIG. 9 is a perspective view of the cylindrical member 24.

FIG. 9 is a perspective view of the cylindrical member 24. The cylindrical member 24 includes a cylindrical part 241 and a protrusion part 242. In the drawing, an X direction, a Y direction, and a Z direction are illustrated in which a direction in which a pair of protrusion parts 242 protrude is the X direction, an axial direction of the cylindrical part 241 having a cylindrical shape is the Z direction, and a direction perpendicular to the X direction and the Z direction is the Y direction.

The cylindrical part 241 is a body part of the cylindrical member 24, and is a hollow cylindrical section. A bundle of the optical fibers 5 and the tubular member 22 can be inserted through the inside of the cylindrical part 241. An inner diameter of the cylindrical part 241 is larger than an outer diameter of the tubular member 22. The protrusion part 242 is formed on an outer periphery of the cylindrical part 241.

The protrusion part 242 is a section protruding outward from the outer periphery of the cylindrical part 241. In one or more embodiments, the pair of protrusion parts 242 protrude outward in the X direction from the outer periphery of the cylindrical part 241. Thus, a width W of the pair of protrusion parts 242 in the X direction (dimension of the cylindrical member 24 in the X direction at a section on which the protrusion parts 242 are formed) is larger than an outer diameter D of the cylindrical part 241.

In one or more embodiments, the amount of protrusion of the protrusion parts 242 in the Y direction is smaller than the amount of protrusion in the X direction. It should be noted that the protrusion parts 242 hardly protrude in the Y direction in one or more embodiments, and thus a dimension H of the cylindrical member 24 in the Y direction at a section on which the protrusion parts 242 are formed is substantially the same as the outer diameter D of the cylindrical part 241. In other words, the dimension H of the protrusion parts 242 in the Y direction (width of the protrusion parts 242 in the Y direction) is substantially the same as the outer diameter D of the cylindrical part 241. In this way, when two cylindrical members 24 overlap each other in the Y direction (described later), a total of dimensions of the two cylindrical members 24 overlapping each other in the Y direction can be suppressed.

The protrusion part 242 is formed in a thin plate shape. Thus, a thickness T of the protrusion part 242 (dimension of the protrusion part 242 in the Z direction) is relatively small (thin) A notch is formed in an edge of the protrusion part 242. Irregularities are formed on the edge of the protrusion part 242 by forming the notch. The end part 10X of the reticulated tube 10 is more easily hooked on the protrusion part 242 by forming the irregularities on the edge of the protrusion part 242, and the cylindrical member 24 is more easily attached to the end part 10X of the reticulated tube 10.

As described later, the protrusion part 242 is used for fixing the end part 10X of the reticulated tube 10 to another member (i.e., an external member such as a housing tray 42 and a branch unit 50 described later). In other words, the protrusion part 242 serves as a fixing part for fixing the cylindrical member 24 to another member (further, the cylindrical member 24 serves as a jig for fixing an end part of the optical fiber unit 3 (end part 10X of the reticulated tube 10)). It should be noted that the end part of the reticulated tube 10 is fixed to another member (such as the housing tray 42 and the branch unit 50 described later) by inserting the protrusion part 242 into a groove (a groove part 471 and a groove 53A described later) of another member. The protrusion part 242 can also be used for fixing (hooking) the end part 10X of the reticulated tube 10 to the cylindrical member 24. In other words, the protrusion part 242 serves as a fixing part for fixing the end part 10X of the reticulated tube 10 to the cylindrical member 24.

In one or more embodiments, the reticulated tube 10 is hooked on the protrusion parts 242 by covering the pair of protrusion parts 242 with the end part 10X of the reticulated tube 10, and the cylindrical member 24 and the end part 10X of the reticulated tube 10 are also fusion-bonded by heating the end part 10X of the reticulated tube 10. However, a method for attaching the cylindrical member 24 to the end part 10X of the reticulated tube 10 is not limited thereto. For example, the cylindrical member 24 may be attached to the end part 10X of the reticulated tube 10 by using an adhesive and an adhesive tape. The cylindrical member 24 may be attached to the end part 10X of the reticulated tube 10 by simply hooking the reticulated tube 10 on the protrusion parts 242 without using an adhesive or an adhesive tape.

Method for Manufacturing Protective Unit 20:

FIGS. 10A to 10D are explanatory diagrams of a method for manufacturing the protective unit 20.

Figure 10A:
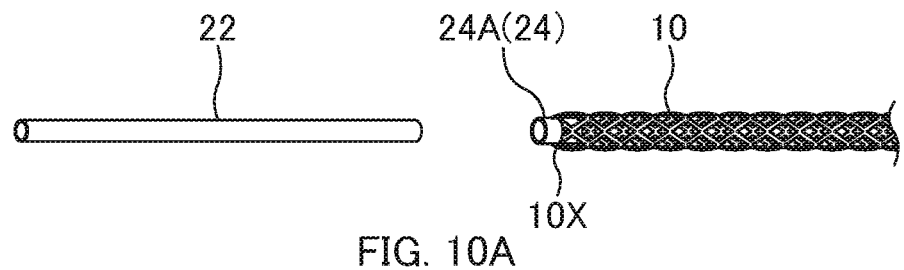
FIGS. 10A to 10D are explanatory diagrams of a method for manufacturing the protective unit 20.
Figure 10B:
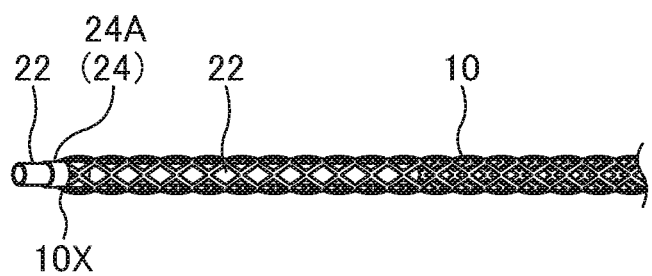
Figure 10C:
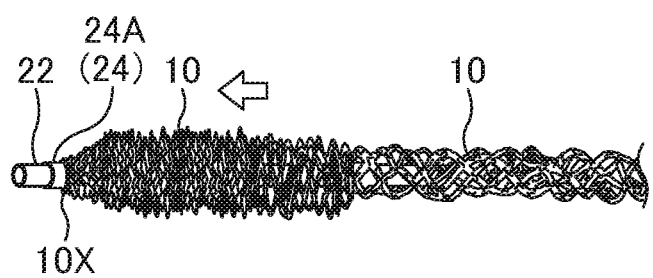
Figure 10D:
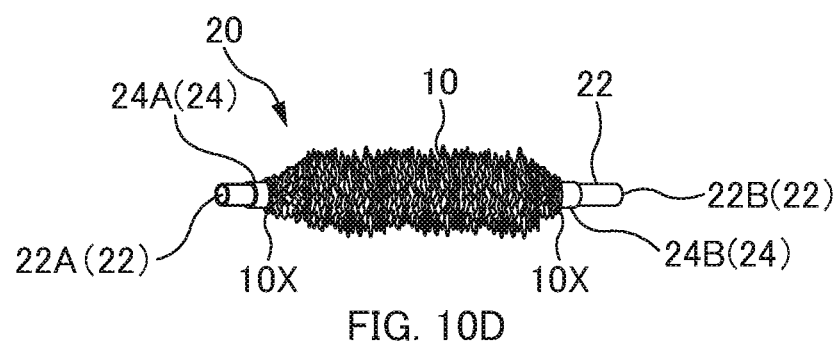

First, as illustrated in FIG. 10A, the reticulated tube 10 having both ends to which the cylindrical members 24 are attached and the tubular member 22 are prepared. As illustrated in FIG. 10B, the tubular member 22 is inserted into the first cylindrical member 24A and the reticulated tube 10, and the first cylindrical member 24A is temporarily fixed to the end part of the tubular member 22. Next, as illustrated in FIG. 10C, the reticulated tube 10 is folded in the longitudinal direction (the reticulated tube 10 contracts in the longitudinal direction) by pulling the reticulated tube 10 toward the first cylindrical member 24A. In this way, the folded reticulated tube 10 can be disposed on the outer periphery of the tubular member 22. Then, as illustrated in FIG. 10D, the reticulated tube 10 is folded in the longitudinal direction and contracts until the second cylindrical member 24B (the cylindrical member 24 attached to the end part 10X on the opposite side of the reticulated tube 10) is located on the outer periphery of the tubular member 22. In this way, the protective unit 20 illustrated in FIG. 1A can be manufactured.

Method for Protecting Optical Fibers 5 by Using Protective Unit 20:

FIGS. 11A to 11E are explanatory diagrams of a method for protecting the optical fibers 5 by using the protective unit 20. It should be noted that FIGS. 11A to 11E are also explanatory diagrams of a method for laying the optical fibers 5 by using the protective unit 20.

First, an operator prepares the protective unit 20 and the optical fibers 5 to be protected. Here, the plurality of optical fibers 5 are led from an optical cable 1. As illustrated in FIG. 11A, the operator inserts the end part 5A of the bundle of the optical fibers 5 into the first end 22A of the tubular member 22.

Next, the operator slides the protective unit 20 toward a lead part (peeling edge) of the optical cable 1 while inserting the optical fibers 5 through the tubular member 22 of the protective unit 20, and causes the first end 22A of the tubular member 22 of the protective unit 20 to reach the vicinity of the peeling edge of the optical cable 1 as illustrated in FIG. 11B. The optical fibers 5 can be inserted through the inside of the folded reticulated tube 10 (and the cylindrical members 24) by inserting the optical fibers 5 through the tubular member 22, and thus the optical fibers 5 are not caught on the reticulated tube 10. Thus, work for inserting the optical fibers 5 through the reticulated tube 10 is easier than that when the optical fibers 5 are directly inserted through the reticulated tube 10.

Incidentally, in one or more embodiments, the reticulated tube 10 is folded in the longitudinal direction by bending the peripheral part 10B of the opening 10A (cf. FIG. 8B), the amount of contraction in the longitudinal direction of the reticulated tube 10 is extremely great (see FIGS. 2B and 10D). Therefore, in one or more embodiments, a length of the reticulated tube 10 and a length of the protective unit 20 are sufficiently shorter than a length of the optical fibers 5 to be protected. As a result, immediately after the end parts 5A of the optical fibers 5 are inserted into the first end 22A of the tubular member 22 as illustrated in FIG. 11A, the end parts 5A of the optical fibers 5 come out of the second end 22B of the tubular member 22. Thus, when the protective unit 20 slides toward the lead part (peeling edge) of the optical fibers 5 (when the state in FIG. 11A is changed to the state in FIG. 11B), the operator can hold the optical fibers 5 coming out of the second end 22B of the tubular member 22 with a hand, and can move the reticulated tube 10 (and the tubular member 22) while pulling the optical fibers 5. In this way, in one or more embodiments, work for moving the protective tube to a root of the optical fibers 5 (in this case, the lead part (peeling edge) of the optical cable 1) is easy. It should be noted that, if the optical fibers 5 to be protected are inserted through the protective tube having about the same length as that of the optical fibers 5 (for example, a long silicon tube or a long polyethylene tube: hereinafter may be referred to as a "silicon tube and the like"), it takes a long time for the optical fibers 5 to come out of an outlet of the protective tube, and thus work for covering the root of the optical fibers 5 with the protective tube is difficult. In contrast, in one or more embodiments, the optical fibers 5 may be inserted through the reticulated tube 10 and the tubular member 22 that are short by using the reticulated tube 10 having an extremely great amount of contraction in the longitudinal direction, and thus workability can be improved.

Next, the operator removes the temporarily fixed first cylindrical member 24A from the tubular member 22, and, as illustrated in FIG. 11C, the operator pulls out the first cylindrical member 24A further to the outside than the first end 22A of the tubular member 22. The end part 10X of the reticulated tube 10 is attached to the first cylindrical member 24A, and thus, when the first cylindrical member 24A is pulled out of the first end 22A of the tubular member 22, the end part 10X of the reticulated tube 10 is also pulled out of the first end 22A of the tubular member 22. In one or more embodiments, since the cylindrical member 24 (first cylindrical member 24A) is attached to the end part 10X of the reticulated tube 10, the end part 10X of the reticulated tube 10 is pulled out of the end part (first end 22A) of the tubular member 22 more easily than when there is no cylindrical member 24. The operator fixes, to the vicinity of the lead part of the optical cable 1, the first cylindrical member 24A pulled out of the tubular member 22. For example, the first cylindrical member 24A is fixed to the optical cable 1 with an adhesive tape. However, the operator holding the protective unit 20 with a right hand catches the first cylindrical member 24A and the lead part of the optical cable 1 with a left hand, and thus the first cylindrical member 24A may be fixed (temporarily fixed) to the optical cable 1.

Next, as illustrated in FIG. 11D, the operator slides the tubular member 22 toward the end parts 5A of the optical fibers 5. At this time, since the optical fibers 5 passes through the inside of the tubular member 22 and the first cylindrical member 24A is fixed to the lead part of the optical cable 1, the reticulated tube 10 is pulled out of the first end 22A of the tubular member 22. As a result, the reticulated tube 10 in a folded state is extended, and, as illustrated in FIG. 2A, the bundle of the optical fibers 5 is inserted through the inside of an extended section of the reticulated tube 10.

Lastly, as illustrated in FIG. 11E, the operator slides the tubular member 22 to the outside further than the end parts 5A of the optical fibers 5, and removes the tubular member 22 from the bundle of the optical fibers 5. At this time, the second cylindrical member 24B temporarily fixed to the tubular member 22 is removed from the tubular member 22, and the tubular member 22 and the reticulated tube 10 are separated. As illustrated in the drawing, the second cylindrical member 24B is in a state of being attached to the end part 10X of the reticulated tube 10.

{Rack 40, Housing Tray 42, and Branch Unit 50}

Figure 12:
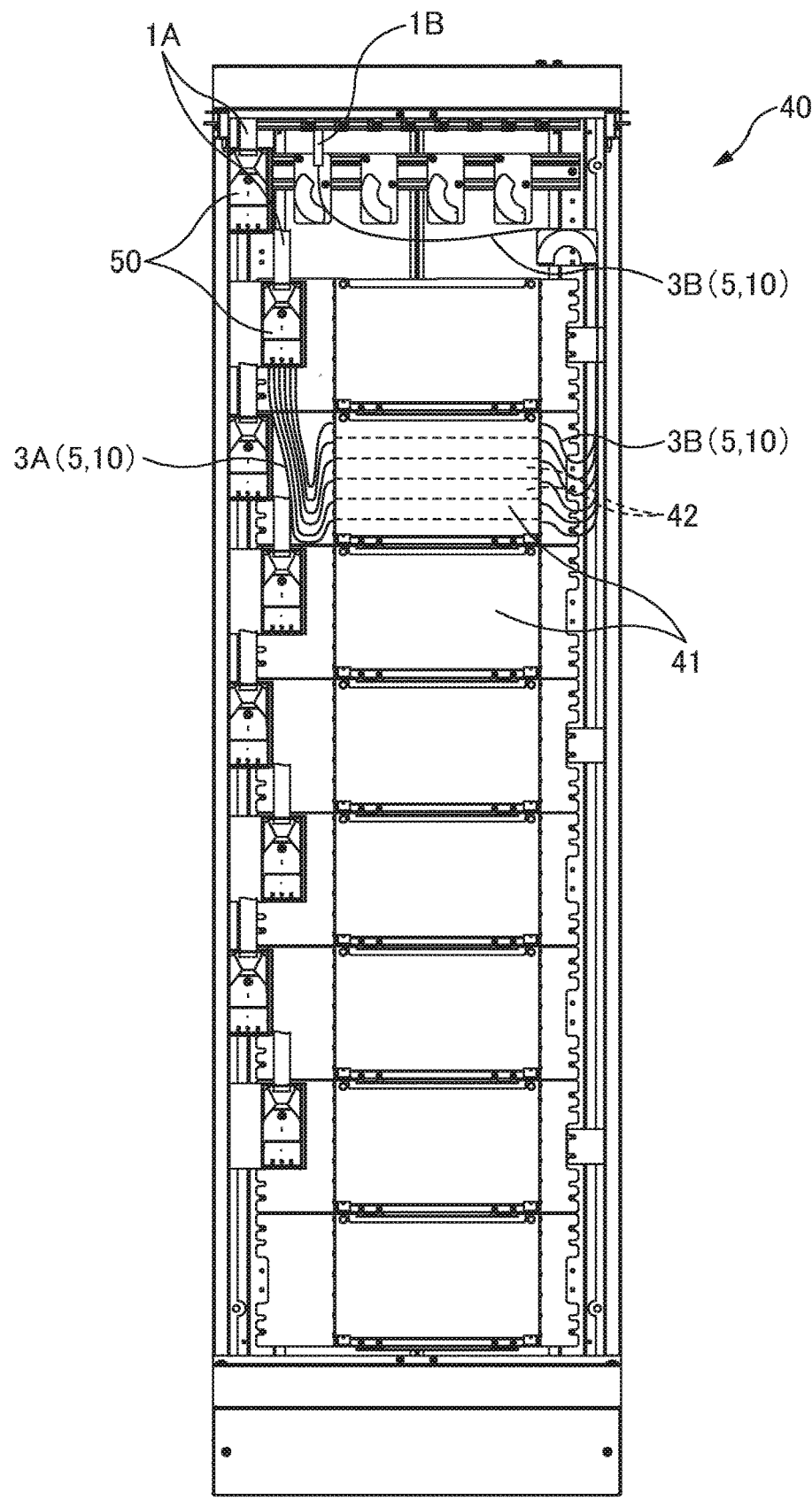
FIG. 12 is an explanatory diagram of a state in a rack 40.

Rack 40:

FIG. 12 is an explanatory diagram of a state in a rack 40.

A first optical cable 1A and a second optical cable 1B are introduced to the rack 40. Many optical fibers 5 of the first optical cable 1A and many optical fibers 5 of the second optical cable 1B are connected to each other, and connecting sections of many optical fibers 5 are housed in the rack 40 (specifically, housing trays 42). In one or more embodiments, the optical fibers 5 of the first optical cable 1A and the optical fibers 5 of the second optical cable 1B are fusion-spliced, and the rack 40 is constituted as a fusion rack that houses many fusion splicing sections. However, the rack 40 may be a termination rack that connector-connects the optical fibers 5 to each other (in this case, a connector is attached to each of the end part 5A of the optical fiber 5 of the first optical cable 1A and the end part 5A of the optical fiber 5 of the second optical cable 1B, and the optical fibers 5 are connector-connected to each other).

In one or more embodiments, in the rack 40, the optical fiber 5 led from the first optical cable 1A and the second optical cable 1B is wired while being inserted through the reticulated tube 10. In the rack 40, the optical fiber 5 led from the first optical cable 1A and the second optical cable 1B is protected by the reticulated tube 10. In the following description, a member in which a bundle of the optical fibers 5 of the first optical cable 1A are inserted through the reticulated tube 10 may be referred to as a "first optical fiber unit 3A", and a member in which a bundle of the optical fibers 5 of the second optical cable 1B are inserted through the reticulated tube 10 may be referred to as a "second optical fiber unit 3B".

The rack 40 includes a housing shelf 41 and the branch unit 50. As illustrated in FIG. 12, in the rack 40, a plurality of housing shelves 41 are aligned in an up-down direction, and the branch unit 50 is disposed beside each of the housing shelves 41. FIG. 12 illustrates only one set of wiring of the first optical fiber unit 3A between one branch unit 50 and one housing shelf 41 (in practice, many first optical fiber units 3A are wired in the rack 40). FIG. 12 illustrates only one set of wiring of the second optical fiber unit 3B to one housing shelf 41 (in practice, many second optical fiber units 3B are wired in the rack 40).

Figure 13:
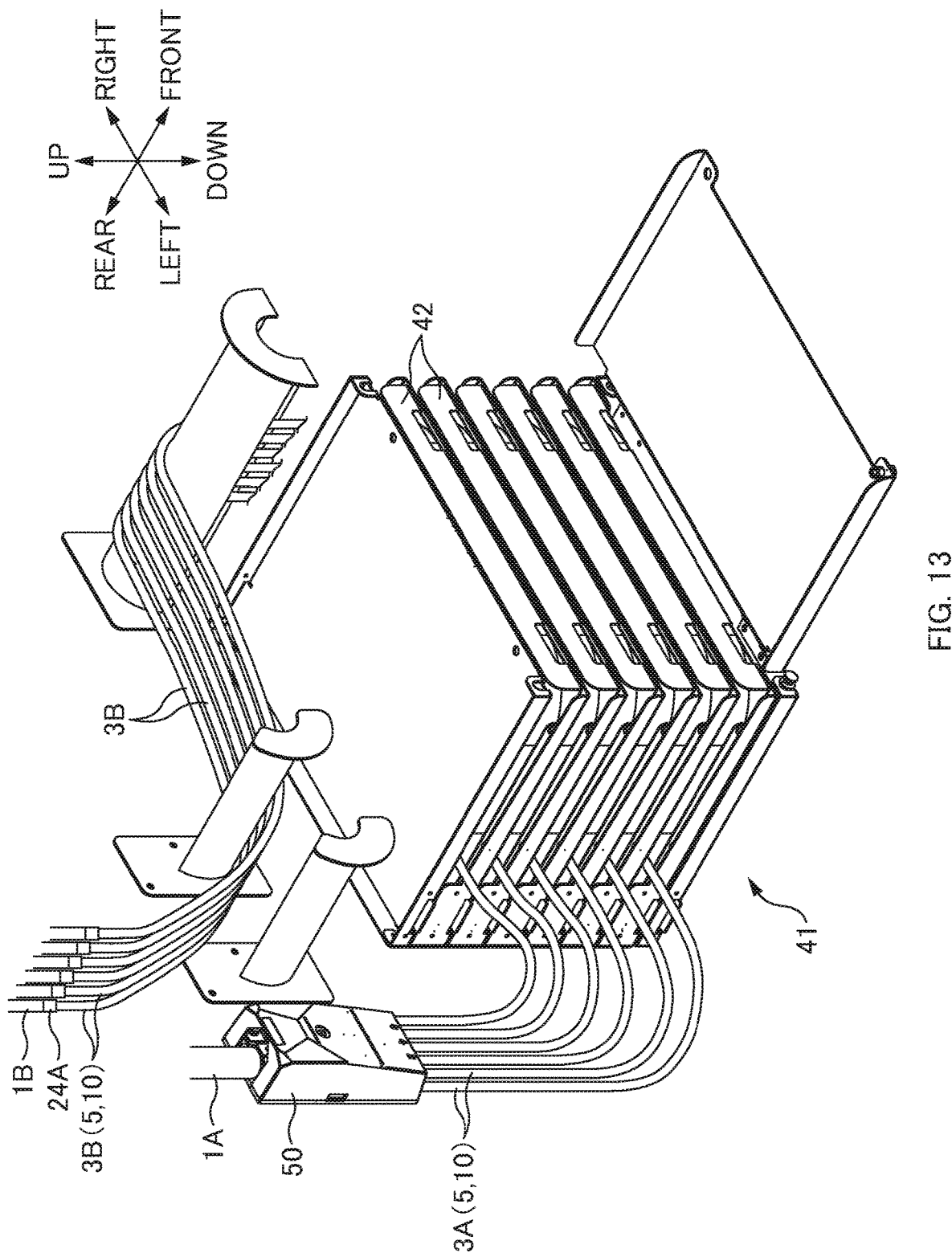
FIG. 13 is a perspective view of a housing shelf 41 and a branch unit 50.

FIG. 13 is a perspective view of the housing shelf 41 and the branch unit 50.

The housing shelf 41 is a shelf including a plurality of (here, six) housing trays 42. In each of the housing trays 42, a bundle of the optical fibers 5 (the plurality of optical fibers 5) of the first optical cable 1A and a bundle of the optical fibers 5 (the plurality of optical fibers 5) of the second optical cable 1B are introduced. In one or more embodiments, the first optical fiber unit 3A and the second optical fiber unit 3B are introduced to each of the housing trays 42. The plurality of optical fibers 5 of the first optical cable 1A and the plurality of optical fibers 5 of the second optical cable 1B are fusion-spliced to each other, and a plurality of fusion splicing sections are housed in the housing tray 42.

A front panel is provided on the housing shelf 41. When the front panel is opened, the housing trays 42 can be taken out of the housing shelf 41.

It should be noted that each direction is defined as illustrated in the drawings in the following description. Specifically, a vertical direction is defined as the "up-down direction", and "up" and "down" are defined according to a direction of the gravity. A direction in which the housing trays 42 are taken in and out from the housing shelf 41 is a "front-rear direction", a side from which the housing trays 42 are taken out is the "front", and an opposite side is the "rear". A direction perpendicular to the up-down direction and the front-rear direction is a "left-right direction", a right side when the housing trays 42 are viewed from the front side is the "right", and an opposite side is the "left". It should be noted that a direction in which the plurality of housing trays 42 of the housing shelf 41 are aligned is the "up-down direction". A tray surface of each housing tray 42 is a surface perpendicular to the up-down direction and parallel to the front-rear direction and the left-right direction.

Figure 14:
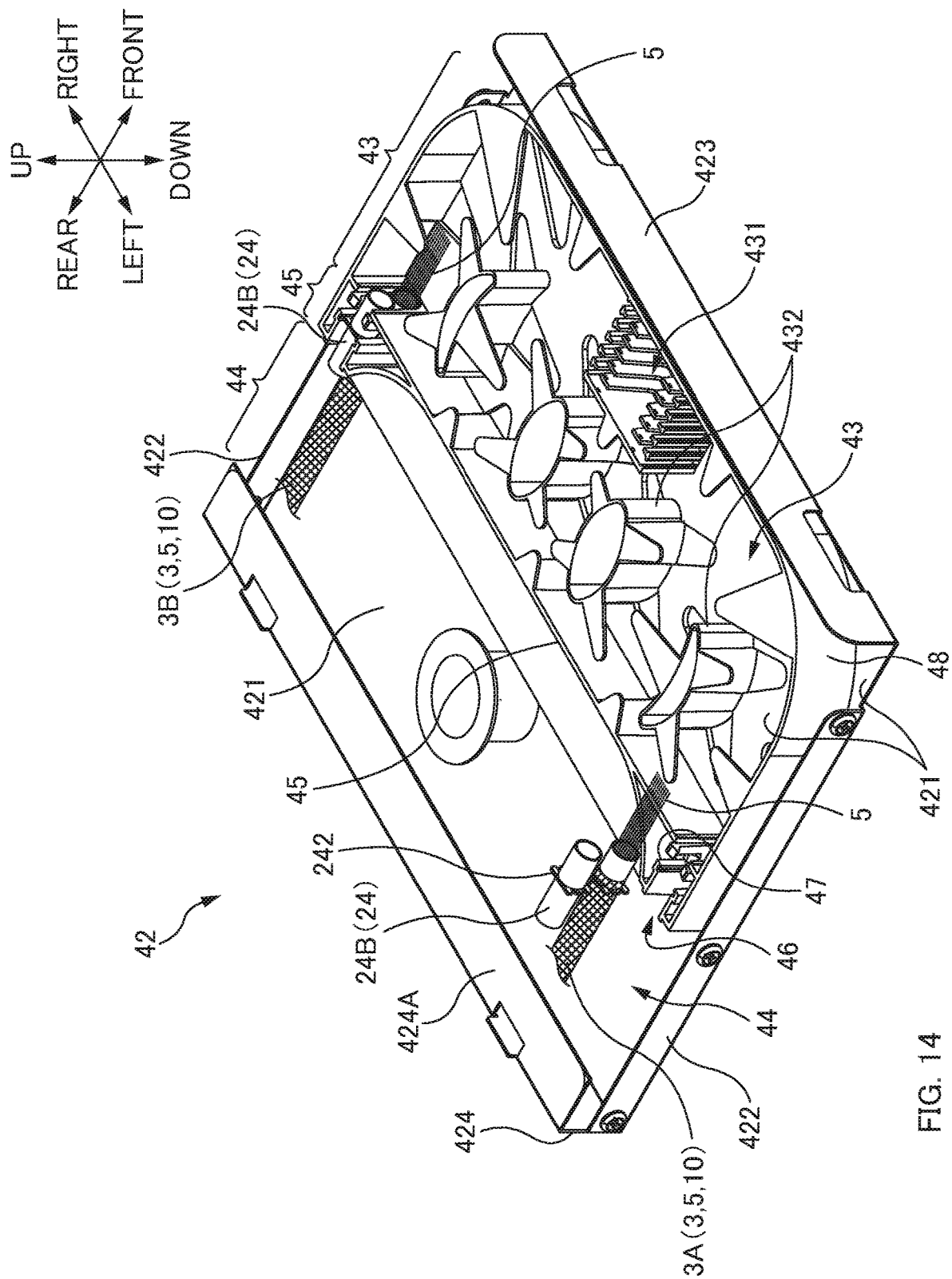
FIG. 14 is a perspective view of a housing tray 42.

Housing Tray 42:

FIG. 14 is a perspective view of the housing tray 42.

The housing tray 42 is a tray that houses an extra length of the optical fibers 5. The housing tray 42 is a housing member that is constituted by a bottom plate part 421, a side plate part 422, a front plate part 423, and a rear plate part 424, is shallow, and has a flat bottom. The bottom plate part 421 is a section constituting the tray surface (placement surface) of the housing tray 42, and a section on which a housed object (the optical fibers 5 and the optical fiber unit 3) is placed. The side plate part 422, the front plate part 423, and the rear plate part 424 are formed so as to extend upward from an edge of the bottom plate part 421. The side plate part 422, the front plate part 423, and the rear plate part 424 are a plate-shaped section that prevents the housed object (the optical fibers 5 and the optical fiber unit 3) from falling off.

A height of the front plate part 423 and the rear plate part 424 is substantially the same as a height of the housing tray 42. In contrast, a height (dimension in the up-down direction) of the side plate part 422 is lower than the height of the housing tray 42 (height of the front plate part 423 and the rear plate part 424). In this way, when the plurality of housing trays 42 are aligned in the up-down direction and disposed in the housing shelf 41, a gap is formed in a side surface of the housing tray 42. The gap is a path for introducing the optical fiber unit 3 to the housing tray 42 (cf. FIG. 13).

The rear plate part 424 includes a folded part 424A. The folded part 424A is a plate-shaped section extending forward from an upper edge of the rear plate part 424. The folded part 424A is disposed so as to face the bottom plate part 421, and a part of the optical fiber unit 3 can be disposed between the folded part 424A and the bottom plate part 421. A part of the optical fiber unit 3 is disposed between the folded part 424A and the bottom plate part 421, and thus a posture of the optical fiber unit 3 housed in the housing tray 42 can be stabilized. When the optical fiber unit 3 is curved in, for example, an eight shape (or a U shape) and housed in a unit housing part 44 (described later), a part of the optical fiber unit 3 is disposed between the folded part 424A and the bottom plate part 421, and thus the folded part 424A makes it difficult for the housed optical fiber unit 3 to fall off.

In one or more embodiments, the housing tray 42 can be taken out of the housing shelf 41. The housing tray 42 is removable from the housing tray 41, and thus work for housing the optical fibers 5 and the optical fiber unit 3 in the housing tray 42 is facilitated.

The housing tray 42 according to one or more embodiments includes a fiber housing part 43, the unit housing part 44, a partition part 45, a communication part 46, and a holding part 47.

The fiber housing part 43 is a housing part that houses an extra length of the optical fibers 5. In the fiber housing part 43, a bundle of the optical fibers 5 (the plurality of optical fibers 5) of the first optical cable 1A, a bundle of the optical fibers 5 (the plurality of optical fibers 5) of the second optical cable 1B, and a plurality of fusion splicing sections are housed. In other words, the plurality of fusion splicing sections and an extra length of the optical fibers 5 fusion-spliced by the fusion splicing sections are housed in the fiber housing part 43. A holder part 431 that holds the fusion splicing sections and a guide part 432 that guides the optical fibers 5 are provided in the fiber housing part 43.

The unit housing part 44 is a housing part that houses an extra length of the optical fiber unit 3. The first optical fiber unit 3A and the second optical fiber unit 3B are housed in the unit housing part 44. In other words, an extra length of the first optical fiber unit 3A and the second optical fiber unit 3B is housed in the fiber housing part 43.

The reticulated tube 10 according to one or more embodiments is configured to be foldable in the longitudinal direction by bending the peripheral parts 10B (peripheral parts 10B surrounding the opening 10A), and the optical fiber unit 3 is constituted by inserting the optical fibers 5 through such a reticulated tube 10, and thus the optical fiber unit 3 according to one or more embodiments is configured to be relatively easily bent and flexible compared to the optical fiber unit 3 in which the optical fibers 5 are inserted through a long silicon tube and the like. Thus, in one or more embodiments, an extra length of the optical fiber unit 3 introduced to the housing tray 42 can be curved in, for example, an eight shape (or a U shape) and housed in the unit housing part 44. It should be noted that, if the optical fiber unit 3 is constituted by inserting the optical fibers 5 through a long silicon tube and the like, rigidity of the silicon tube and the like is higher than that of the reticulated tube 10, and the optical fiber unit 3 is hard to curve. Thus, it is difficult to house the optical fiber unit 3 in the unit housing part 44.

The partition part 45 is a section that partitions the fiber housing part 43 and the unit housing part 44. A space in front of the partition part 45 (space between the partition part 45 and the front plate part 423) is the fiber housing part 43, and a space in rear of the partition part 45 (space between the partition part 45 and the rear plate part 424) is the unit housing part 44. The communication part 46 is formed in the partition part 45.

The communication part 46 is a section (communication path; path) that communicates between the fiber housing part 43 and the unit housing part 44. The communication part 46 is a section formed so as to penetrate the partition part 45 in the front-rear direction. The optical fibers 5 are wired between the fiber housing part 43 and the unit housing part 44 through the communication part 46. The communication part 46 is formed in a groove shape and open upward. In this way, the optical fibers 5 are inserted into the communication part 46 from above, and the optical fibers 5 are wired between the fiber housing part 43 and the unit housing part 44. In one or more embodiments, the cylindrical member 24 is inserted into the communication part 46 from above, and thus the optical fibers 5 inserted through the cylindrical member 24 are wired between the fiber housing part 43 and the unit housing part 44. In one or more embodiments, two cylindrical members 24 can be disposed in a vertically aligned state in the communication part 46.

In one or more embodiments, two communication parts 46 are formed in the partition part 45. One of the communication parts 46 is used for wiring the optical fibers 5 of the first optical fiber unit 3A, and the other communication part 46 is used for wiring the optical fibers 5 of the second optical fiber unit 3B. The two communication parts 46 are formed in an end part on each of the left and right of the partition part 45. In this way, a curve of the optical fiber unit 3 housed in the unit housing part 44 can be made gentle. If the communication part 46 is formed in a central part (central part in the left-right direction) of the partition part 45, the optical fiber unit 3 needs to be suddenly curved in the vicinity of the communication part 46. Thus, it is desirable that the communication parts 46 are formed in the end parts in the left-right direction of the partition part 45.

The holding part 47 is formed in each communication part 46. The holding part 47 is a section that holds the cylindrical member 24 (cylindrical member 24 attached to the end part 10X of the reticulated tube 10) of the protective unit 20. In one or more embodiments, the holding part 47 can hold two cylindrical members 24 in a vertically aligned state. However, the holding part 47 may hold one cylindrical member 24, and may hold two or more cylindrical members 24. The end part of the optical fiber unit 3 (bundle of the optical fibers 5 inserted through the reticulated tube 10) can be fixed to the housing tray 42 by providing the holding part 47, and movement of the optical fibers 5 (optical fibers 5 extending from the optical fiber unit 3) housed in the fiber housing part 43 can be suppressed.

Figure 15:
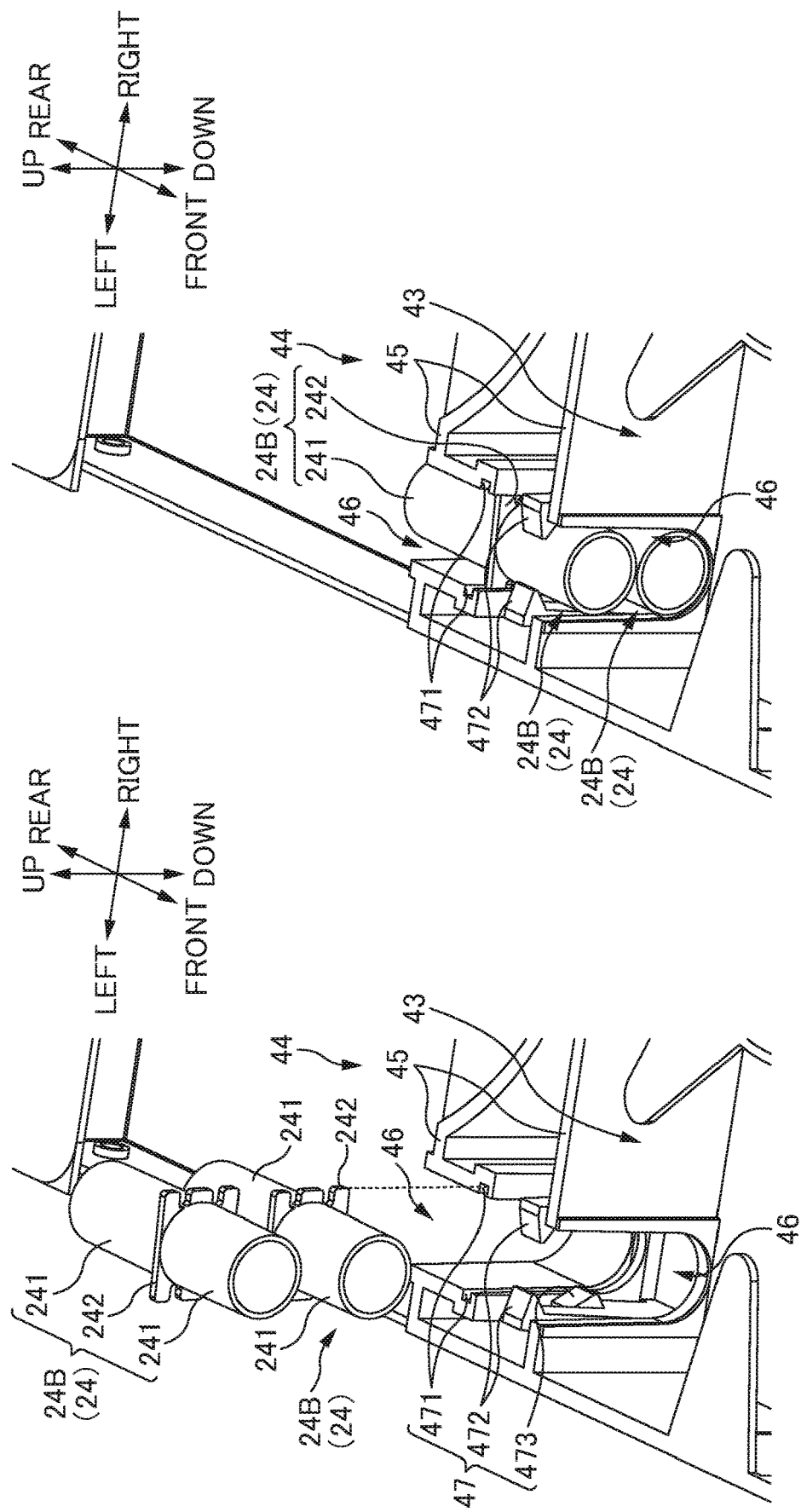
FIG. 15A is an enlarged perspective view of a holding part 47.
FIG. 15B is a diagram of a state in which the cylindrical member 24 is held in the holding part 47.

FIG. 15A is an enlarged perspective view of the holding part 47. FIG. 15B is a diagram of a state in which the cylindrical member 24 is held in the holding part 47.

The holding part 47 includes the groove parts 471. The groove parts 471 are formed in left and right side surfaces of the communication part 46 along the up-down direction. The protrusion parts 242 of the cylindrical member 24 are inserted into the groove parts 471. The cylindrical member 24 is fixed to the holding part 47 by inserting the protrusion parts 242 of the cylindrical member 24 into the groove parts 471.

The holding part 47 includes a pair of lower claw parts 472 and a pair of upper claw parts 473.

The lower claw parts 472 are a section (press part) that suppresses the lower cylindrical member 24 coming off the holding part 47. The pair of lower claw parts 472 are disposed so as to press the upper side of the cylindrical part 241 of the cylindrical member 24 attached to the communication part 46. It is desirable that an interval in the left-right direction between the pair of lower claw parts 472 is narrower than an outer diameter of the cylindrical part 241 of the cylindrical member 24. It is desirable that the pair of lower claw parts 472 is elastically deformed such that the interval in the left-right direction spreads.

The upper claw parts 473 are a section (press part) that suppresses the upper cylindrical member 24 coming off the holding part 47. The pair of upper claw parts 473 are disposed so as to press the upper side of the cylindrical part 241 of the upper cylindrical member 24. It is desirable that an interval in the left-right direction between the pair of upper claw parts 473 is narrower than an outer diameter of the cylindrical part 241 of the cylindrical member 24. It is desirable that the pair of upper claw parts 473 are elastically deformed such that the interval in the left-right direction spreads.

It should be noted that, in one or more embodiments, the lower claw parts 472 and the upper claw parts 473 constitute the press part that presses the cylindrical member 24 from above (in a direction in which the protrusion parts 242 are inserted into the groove parts 471). However, the press part that presses the cylindrical member may not have a claw shape. In one or more embodiments, two press parts (the lower claw parts 472 and the upper claw parts 473) are vertically formed, but the number of the press parts provided on the holding part 47 is not limited to two.

In one or more embodiments, the fiber housing unit 48 is disposed on the front side of the housing tray 42, and thus the fiber housing part 43 and the unit housing part 44 are formed. The fiber housing unit 48 is a member acquired by integrally molding the fiber housing part 43, the partition part 45, and the communication part 46 from resin. However, a method for forming the fiber housing part 43 and the unit housing part 44 in the housing tray 42 is not limited thereto. The unit housing part 44 may be integrally molded together with the fiber housing part 43 from resin. The fiber housing part 43 and the unit housing part 44 may be formed by placing, in the housing tray 42, the partition part 45 made of resin to partition the housing space of the housing tray 42 into two by the partition part 45.

Figure 16:
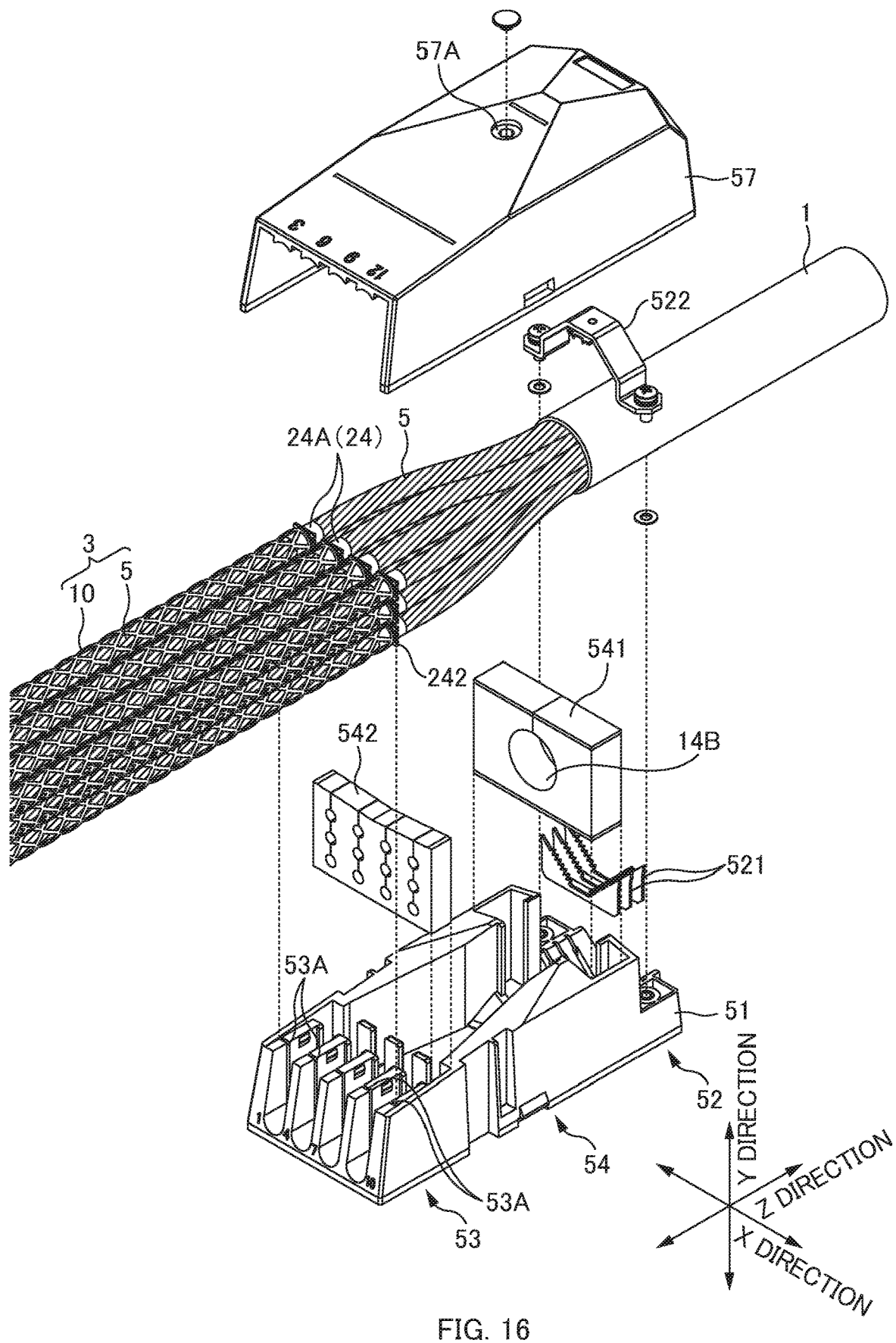
FIG. 16 is an exploded view of the branch unit 50 according to one or more embodiments.
Figure 17:
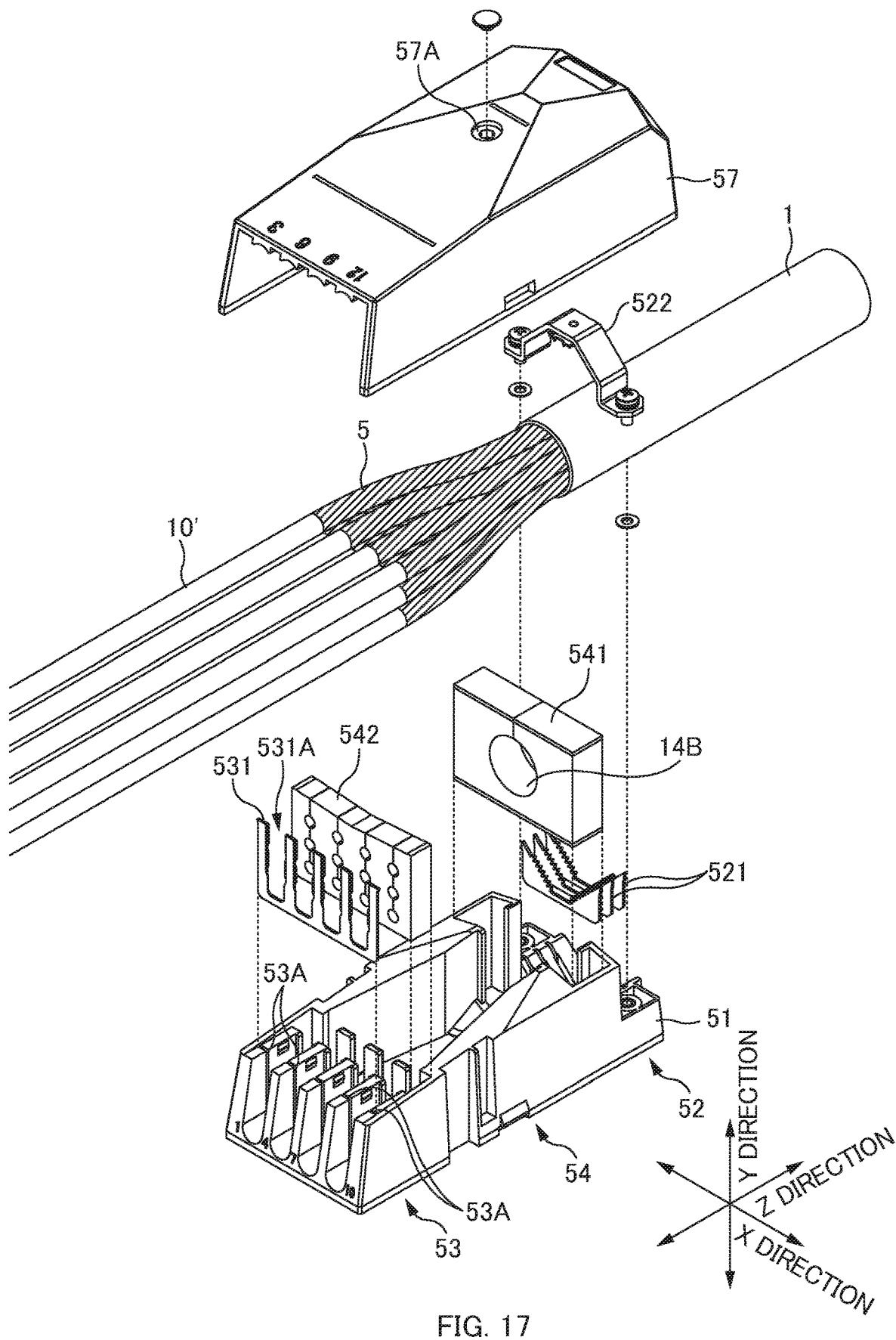
FIG. 17 is an exploded view of a branch unit 50 according to a reference example.

Branch Unit 50:

FIG. 16 is an exploded view of the branch unit 50 according to one or more embodiments. FIG. 17 is an exploded view of a branch unit 50 according to a reference example. In FIG. 16, a divided bundle of the optical fibers 5 is inserted through the reticulated tube 10 and the cylindrical member 24 (first cylindrical member 24A). In contrast, in the reference example in FIG. 17, a divided bundle of the optical fibers 5 is inserted through a long silicon tube 10' as a protective tube.

The branch unit 50 is a member that divides a plurality of bundles of the optical fibers 5 from the optical cable 1. The bundle of the optical fibers 5 divided from the branch unit 50 is wired to the housing tray 42 while being inserted through the reticulated tube 10 (and the cylindrical member 24). As illustrated in FIG. 17, the bundle of the optical fibers 5 is normally inserted through the long silicon tube 10', and the optical fibers 5 are thus protected. In contrast, in one or more embodiments, the reticulated tube 10 protects the bundle of the optical fibers 5 as illustrated in FIG. 16.

The branch unit 50 includes a body part 51 and a lid 57.

The body part 51 is a section that holds the optical cable 1 and a divided bundle of the optical fibers 5. The body part 51 includes a first fixing part 52, a second fixing part 53, and a housing part 54.

The first fixing part 52 is a section (cable fixing part) that fixes the end part of the optical cable 1 (first optical cable 1A). The first fixing part 52 includes a support part 521 and a fastening part. The support part 521 is a member that supports the optical cable 1. Here, the support part 521 is constituted by a saw teeth plate including teeth that dig into the sheath of the optical cable 1, but the support part 521 may not include the teeth. The support part 521 may be integrally formed with the body part 51. The fastening member 522 is a member that fixes the optical cable 1 between the support part 521 and the fastening member 522.

The second fixing part 53 is a section that fixes the protective tube (the reticulated tube 10 in one or more embodiments and the silicon tube 10' in the reference example) through which a bundle of the optical fibers 5 is inserted. The second fixing part 53 includes the grooves 53A to which a holding plate 531 (cf. FIG. 17) can be attached. The holding plate 531 is a metal plate including teeth that dig into the silicon tube 10'. As illustrated in FIG. 17, the holding plate 531 includes four recessed parts 531A, and four silicon tubes 10' can be inserted into the respective recessed parts 531A.

In one or more embodiments, as illustrated in FIG. 16, the holding plate 531 is not attached to the second fixing part 53, and the protrusion parts 242 of the cylindrical member 24 are inserted into the grooves 53A of the second fixing part 53. The cylindrical member 24 is fixed to the second fixing part 53 by inserting the protrusion parts 242 of the cylindrical member 24 into the grooves 53A of the second fixing part 53. In one or more embodiments, the second fixing part 53 can fix three cylindrical members 24 in a vertically aligned state. However, the second fixing part 53 may fix one or two cylindrical members 24, and may fix three or more cylindrical members 24. In one or more embodiments, by fixing the cylindrical member 24 to the second fixing part 53, the end part of the optical fiber unit 3 can be fixed to the branch unit 50, and movement (coming off) of the reticulated tube 10 through which the optical fibers 5 are inserted can also be suppressed.

The housing part 54 is a section that houses a branch part (lead part; peeling edge) of the optical cable 1. The lead part of the optical cable 1 can be bonded and fixed to the branch unit 50 by filling the housing part 54 with an adhesive. The adhesive is filled in the housing part 54 from an injection opening 57A of the lid 57 after the lid 57 is attached to the body part 51. In order to prevent a leakage of the adhesive, an upstream stopper 541 is provided on an upstream side of the housing part 54, and a downstream stopper 542 is provided on a downstream side of the housing part 54.

In one or more embodiments, the optical cable 1 includes 12 bundles of the optical fibers 5. In one or more embodiments, after the optical cable 1 is led, each of the bundles of the optical fibers 5 is inserted through the reticulated tube 10 and the cylindrical member 24 by using the protective unit 20 as illustrated in FIGS. 11A to 11E. In one or more embodiments, when the bundle of the optical fibers 5 is inserted through the reticulated tube 10 by using the protective unit 20, the cylindrical member 24 (first cylindrical member 24A) is disposed near the lead part of the optical cable 1. FIG. 16 illustrates 12 first cylindrical members 24A (and 12 reticulated tubes 10) through which the bundle of the optical fibers 5 is inserted.

In one or more embodiments, the cylindrical member 24 (first cylindrical member 24A) can be fixed to the second fixing part 53. Specifically, the cylindrical member 24 (first cylindrical member 24A) is fixed to the second fixing part 53 by inserting the protrusion parts 242 of the cylindrical member 24 from above into the grooves 53A of the second fixing part 53 with the holding plate 531 being removed. The protrusion parts 242 of the three cylindrical members 24 vertically aligned can be inserted into the respective grooves 53A.

When the protective unit 20 in one or more embodiments is used, work for inserting the optical fibers 5 (work for protecting the optical fibers 5) is easier than that when the optical fibers 5 are inserted through the long silicon tube 10' (cf. FIG. 17) in the reference example. According to one or more embodiments, the cylindrical member 24 of the protective unit 20 can be fixed as it is to the second fixing part 53 of the branch unit 50, which is convenient.

Figures 18A, 18B, 18C:
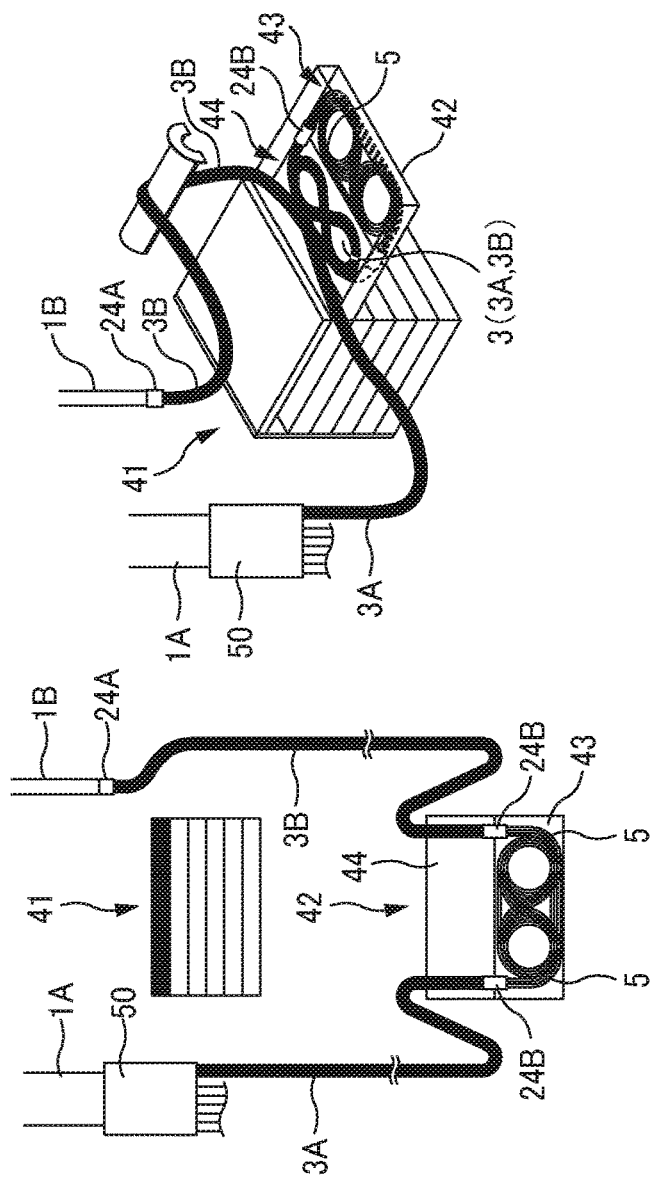
FIGS. 18A to 18C are explanatory diagrams of a method for laying the optical fibers 5 by using the housing tray 42 according to one or more embodiments.

Method for Laying Optical Fibers 5:

FIGS. 18A to 18C are explanatory diagrams of a method for laying the optical fibers 5 by using the housing tray 42 according to one or more embodiments. It should be noted that the drawings illustrate a housing method (optical fiber housing method) for housing the optical fibers 5 in the housing tray 42.

First, as illustrated in FIGS. 11A to 11E, an operator inserts a bundle of the optical fibers 5 of the first optical cable 1A through the reticulated tube 10 by using the protective unit 20, and creates the first optical fiber unit 3A. After the operator creates the first optical fiber unit 3A, as illustrated in FIG. 16, the operator inserts the first cylindrical member 24A of the reticulated tube 10 into the second fixing part 53 and fixes the first cylindrical member 24A, attaches the lid 57 to the body part 51, fills the housing part 54 with an adhesive from the injection opening 57A of the lid 57, and fixes the first optical cable 1A and the first optical fiber unit 3A to the branch unit 50. 12 first optical fiber units 3A extend from the branch unit 50, but FIG. 18A illustrates only one first optical fiber unit 3A among them. As illustrated in FIGS. 11A to 11E, the operator inserts a bundle of the optical fibers 5 of the second optical cable 1B through the reticulated tube 10 by using the protective unit 20, and creates the second optical fiber unit 3B.

Next, as illustrated in FIG. 18A, the operator fusion-splices the plurality of optical fibers 5 of the first optical cable 1A extending from the second cylindrical member 24B and the plurality of optical fibers 5 of the second optical cable 1B extending from the second cylindrical member 24B by using a fusion splicing device. For example, when the first optical fiber unit 3A and the second optical fiber unit 3B each include 24 12-core intermittently connected optical fiber ribbons, the operator takes out one optical fiber ribbon from each of the first optical fiber unit 3A and the second optical fiber unit 3B, sets the optical fiber ribbon in the fusion splicing device, and fusion-splices the optical fibers 5 to each other.

In one or more embodiments, an extra length of the first optical fiber unit 3A and the second optical fiber unit 3B can be housed in the unit housing part 44 of the housing tray 42, and thus the first optical fiber unit 3A and the second optical fiber unit 3B can be made relatively long. Thus, in one or more embodiments, a restriction on a placement space of the fusion splicing device can be reduced, and fusion work can be performed at a place away from the rack 40. It should be noted that, if the optical fiber unit 3 is constituted by inserting the optical fibers 5 through the long silicon tube 10', the optical fiber unit 3 is hard to curve, and thus the optical fiber unit 3 cannot be housed in the housing tray 42 and an extra length of the optical fiber unit 3 cannot be made long. Therefore, the fusion work needs to be performed near the rack 40, and such fusion work is inconvenient. In one or more embodiments, the fusion work can be performed at a place away from the rack 40, and thus the fusion work can be performed simultaneously by a plurality of operators.

In addition, the first optical fiber unit 3A and the second optical fiber unit 3B according to one or more embodiments are constituted by inserting the optical fibers 5 through the flexible reticulated tube 10, and are thus configured to be relatively easily bent and be flexible. Thus, in one or more embodiments, work for setting the optical fibers 5 in the fusion splicing device is easy. It should be noted that, if the optical fiber unit 3 is constituted by inserting the optical fibers 5 through the silicon tube 10', rigidity of the silicon tube 10' is high, and the optical fiber unit 3 is hard to curve. Thus, the work for setting the optical fibers 5 in the fusion splicing device is inconvenient.

As illustrated in FIG. 18B, after fusion splicing of the optical fibers 5, the operator attaches the second cylindrical member 24B to the holding part 47 of the housing tray 42, and also houses an extra length of the optical fibers 5 in the fiber housing part 43 of the housing tray 42. In one or more embodiments, while the housing tray 42 is taken out from the housing shelf 41, an extra length of the optical fibers 5 can be housed in the fiber housing part 43 of the housing tray 42, and thus work for housing the optical fibers 5 is facilitated. When the second cylindrical member 24B is attached to the holding part 47 of the housing tray 42, the optical fibers 5 of the first optical fiber unit 3A and the second optical fiber unit 3B are wired in the communication part 46 (cf. FIGS. 14 and 15A) of the housing tray 42. When the second cylindrical member 24B is attached to the holding part 47 of the housing tray 42, the end parts of the first optical fiber unit 3A and the second optical fiber unit 3B are disposed in the unit housing part 44 of the housing tray 42.

Next, as illustrated in FIG. 18C, the operator houses an extra length of the first optical fiber unit 3A in the unit housing part 44 of the housing tray 42, and also houses an extra length of the second optical fiber unit 3B in the unit housing part 44 of the housing tray 42. It should be noted that, when the second cylindrical member 24B is attached to the holding part 47 of the housing tray 42 (cf. FIG. 18B), the end part of the optical fiber unit 3 is in a state of being disposed in the unit housing part 44 of the housing tray 42, and thus work for housing an extra length of the optical fiber unit 3 in the unit housing part 44 is easy. In one or more embodiments, the end part of the optical fiber unit 3 is in a fixed state by fixing the second cylindrical member 24B to the holding part 47 of the housing tray 42, and thus the work for housing an extra length of the optical fiber unit 3 in the unit housing part 44 is easy.

Summary

The protective unit 20 according to one or more embodiments includes the reticulated tube 10, the tubular member 22, and the cylindrical member 24 (cf. FIGS. 1A to 1C). In the reticulated tube 10, many openings 10A (meshes) are reticulately formed, and the plurality of optical fibers 5 can be inserted through the inside. It should be noted that the reticulated tube 10 has a great amount of extension and contraction in the longitudinal direction, and thus work for protecting an optical fiber when the optical fiber is laid is facilitated. The tubular member 22 is inserted through the reticulated tube 10, and is configured to be inserted with the plurality of optical fibers 5 through the tubular member. The tubular member 22 is disposed inside the reticulated tube 10, and thus the end part 5A of the optical fiber 5 is not caught on the reticulated tube 10 when the optical fibers 5 are inserted through the reticulated tube 10. Thus, the work for protecting the optical fiber when the optical fiber is laid is facilitated. Furthermore, in one or more embodiments, the cylindrical member 24 is attached to the end part 10X of the reticulated tube 10. In this way, the end part 10X of the reticulated tube 10 is pulled out of the end part (first end 22A) of the tubular member 22 more easily than a case with no cylindrical member 24, and the work for protecting an optical fiber is facilitated. It should be noted that, in the embodiments described above, the cylindrical member 24 is attached to both end parts 10X of the reticulated tube 10, but the cylindrical member 24 may be attached to only one of the end parts 10X.

In one or more embodiments, as illustrated in FIGS. 1A and 8B, the reticulated tube 10 is folded in the longitudinal direction by bending the peripheral part 10B of the opening 10A. In this way, the amount of extension and contraction of the reticulated tube 10 in the longitudinal direction increases, and thus the work for protecting an optical fiber when the optical fiber is laid is facilitated.

In one or more embodiments, as illustrated in FIG. 1C, the reticulated tube 10 in a folded state is extendable in the longitudinal direction by pulling out the cylindrical member 24 from the tubular member 22. In this way, the work for protecting an optical fiber when the optical fiber is laid is facilitated.

As illustrated in FIG. 3A or 6B, the reticulated tube 10 according to one or more embodiments includes the plurality of first wire rods 11 disposed in a spiral shape in a predetermined direction, and the plurality of second wire rods 12 disposed in a direction different from the first wire rods 11, and an intersection point of the first wire rod 11 and the second wire rod 12 is bonded. With this configuration, it is possible to easily manufacture the reticulated tube 10. With this configuration, the peripheral part 10B is configured to be easily bent. However, as illustrated in FIG. 5A, the reticulated tube 10 may be configured without bonding two wire rods.

In the reticulated tube 10 in one or more embodiments, an intersection point of the first wire rod 11 and the second wire rod 12 is fusion-bonded. In this way, it is possible to easily manufacture the reticulated tube 10. When the reticulated tube 10 is constituted by fusion-bonding an intersection point of the first wire rod 11 and the second wire rod 12, it is desirable that the cylindrical member 24 and the end part 10X of the reticulated tube 10 are fusion-bonded. In this way, the end part 10X of the reticulated tube 10 is easily attached to the cylindrical member.

The cylindrical member 24 in one or more embodiments includes the hollow cylindrical part 241, and the protrusion part 242 protruding outward from the outer periphery of the cylindrical part 241. In this way, work for fixing the end part 10X of the reticulated tube 10 by using the protrusion part 242 and the like are facilitated. For example, the protrusion part 242 can be used for hooking the end part 10X of the reticulated tube 10. The protrusion part 242 can also be used for fixing the end part 10X of the reticulated tube 10 to the housing tray 42 and the branch unit 50.

It should be noted that, when irregularities are formed on the edge of the protrusion part 242 as illustrated in FIG. 9, the end part 10X of the reticulated tube 10 is more easily hooked on the protrusion part 242. However, the irregularities may not be formed on the edge of the protrusion part 242. The protrusion part 242 may not be provided on the cylindrical member 24. Even in a case that the protrusion part 242 is not provided on the cylindrical member 24, the end part 10X of the reticulated tube 10 is easily pulled out of the end part of the tubular member 22 when the cylindrical member 24 is attached to the end part 10X of the reticulated tube 10.

{Reference Description}

With Regard to Young's Modulus and Flexural Rigidity of Wire Rod:

A Young's modulus and flexural rigidity of the wire rod (the first wire rod 11 or the second wire rod 12) of the double-layer monofilament illustrated in FIG. 4A were measured. Here, the wire rod of the double-layer monofilament constituted by an organic material was created with the core parts 13 being polyester and the sheath part 14 being polypropylene. A cross-sectional shape of the wire rod had a thickness of 0.1 mm and a width of 1 mm. As a result of the measurement, a Young's modulus of the wire rod was approximately 4000 N/mm$^2$, and flexural rigidity was approximately 0.5 N/mm$^2$. It should be noted that the Young's modulus and flexural rigidity of the wire rod were measured as follows.

The Young's modulus was measured by using a tensile testing machine. Here, a test piece (wire rod) was set between chucks set to 200 mm, and a load-elongation curve was measured with a tensile speed as 200 mm/min. The Young's modulus (unit: N/mm$^2$) of the wire rod was measured based on an initial inclination of a straight line part of the measured load-elongation curve.

Figure 19A:
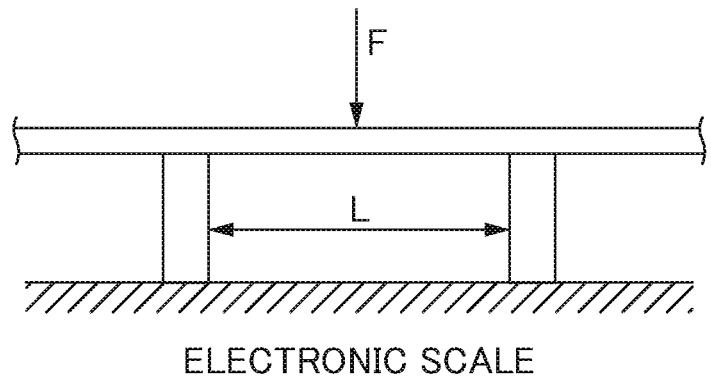
FIG. 19A is an explanatory diagram of a method for measuring flexural rigidity.
Figure 19B:
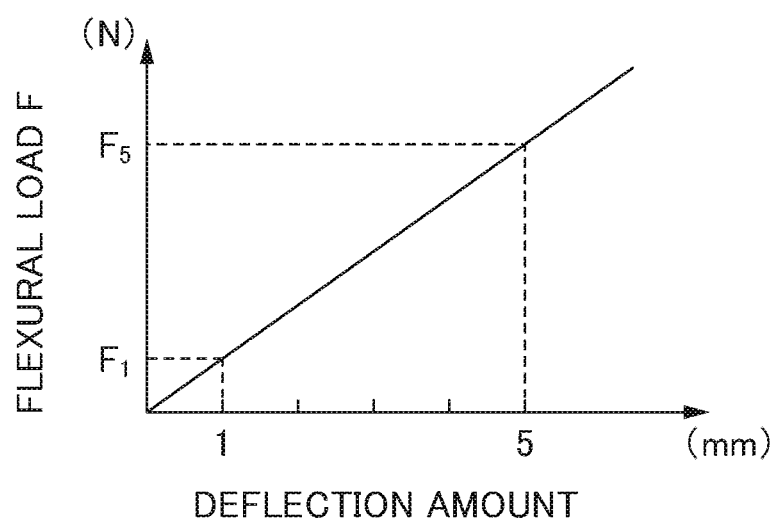
FIG. 19B is an explanatory diagram of a load-deflection diagram.

The flexural rigidity was measured based on a three-point flexural test. FIG. 19A is an explanatory diagram of a method for measuring flexural rigidity. FIG. 19B is an explanatory diagram of a load-deflection diagram. As illustrated in FIG. 19A, a test piece (wire rod) was set between fulcrums having a distance L set to 30 mm, and a flexural modulus of elasticity E was measured based on the three-point flexural test. Here, a flexural load F1 when a deflection amount was 1 mm and a flexural load F5 when a deflection amount was 5 mm were measured (cf. FIG. 19B), and a flexural modulus of elasticity E was measured based on the measured flexural loads F1 and F5. It should be noted that the flexural load F1 was measured by using an electronic scale disposed under the fulcrums. Flexural rigidity EI (unit: N mm$^2$) was calculated based on the measured flexural modulus of elasticity E (unit: Pa) and an elastic secondary moment I (unit: mm$^4$) of the test piece.

With Regard to Contraction Ratio R1:

A plurality of types of the protective units 20 varying in the number N (total number 2N) of each of the first wire rods 11 and the second wire rods 12, an inner diameter D of the reticulated tube 10, a spiral pitch L, and an outer diameter S of the tubular member 22 were created. Here, the number of the first wire rods 11 and the second wire rods 12 was each four (eight in total) or six (12 in total). The inner diameter D of the reticulated tube 10 fell in a range of 6.3 mm to 8.3 mm. The spiral pitch L was 20 mm to 100 mm. The outer diameter S of the tubular member 22 fell in a range of 3.5 mm to 8 mm.

Figure 20:
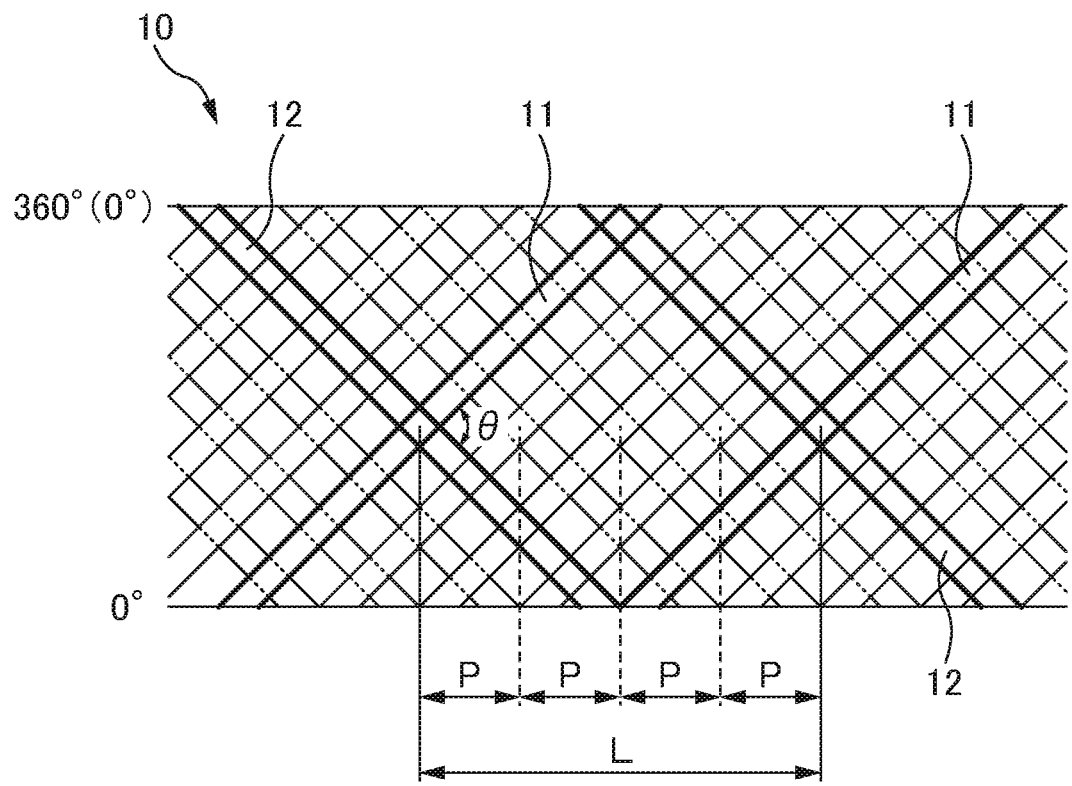
FIG. 20 is an explanatory diagram of a pitch P and an inner diameter D.

FIG. 20 is an explanatory diagram of a pitch P and an inner diameter D. When the number of the first wire rods 11 (or the second wire rods 12) was s and a spiral pitch of the first wire rods 11 for one turn as illustrated in the diagram was L (mm), the pitch P (mm) was P=L/s. As illustrated in the diagram, when an angle (size of an angle open toward the longitudinal direction) of an intersection point of the first wire rod 11 and the second wire rod 12 was θ, the inner diameter D (mm; diameter of an inside dimension) was calculated as in the following equation.

$D = L \times \tan(\theta/2)/\pi$

A contraction ratio R1 when each reticulated tube 10 was contracted in the longitudinal direction was measured. It should be noted that, when a length (initial length) of the reticulated tube 10 before contraction in the longitudinal direction was L0 and a length (length during contraction) of the reticulated tube 10 after contraction in the longitudinal direction was L1, a contraction ratio R1(%) was as in the following equation.

$R1(\%) = L1/L0 \times 100$

A measurement result of the contraction ratio R1 of each reticulated tube 10 was as in the following table (it was determined that the contraction ratio R1 of 3 to 12% could be achieved). It should be noted that, when each reticulated tube 10 was contracted in the longitudinal direction, the reticulated tube 10 could be easily folded in the longitudinal direction with force of a hand, and buckling of the tubular member 22 did not occur.

TABLE 1

| Total number 2N | 12 | 12 | 12 | 12 | 8 | 12 | 12 |
|---|---|---|---|---|---|---|---|
| Inner diameter D [mm] | 7 | 8.3 | 8 | 7 | 6.3 | 7 | 7 |
| Spiral pitch L [mm] | 100 | 50 | 30 | 20 | 30 | 20 | 20 |
| Outer diameter S [mm] | 8 | 8 | 8 | 3.5 | 6 | 5 | 6 |
| Contraction ratio R1 [%] | 3 | 5 | 7 | 8 | 8.8 | 10 | 12 |

With Regard to Mesh Ratio R:

A plurality of types of the reticulated tubes 10 varying in a mesh ratio R were created by changing the number of the first wire rods 11 and the second wire rods 12 of the reticulated tube 10 and a spiral pitch. Here, the number of the first wire rods 11 and the second wire rods 12 was each four (eight in total) or six (12 in total). The spiral pitch was 50 mm or 100 mm. When a ratio of an area occupied by the openings 10A on the developed plane to a total area (sum of the area occupied by the openings 10A and an area occupied by the peripheral parts 10B) of the reticulated tube on the developed plane was the mesh ratio R (%), the mesh ratios R of the respective reticulated tubes 10 were 46.2%, 55.5%, and 49.4%.

Work for actually attaching, to a closure, the reticulated tube 10 through which a bundle of the optical fibers 5 was inserted was performed, and an evaluation of whether the optical fibers 5 (optical fiber ribbon inserted through the reticulated tube 10) or the peripheral part 10B (the first wire rod 11 and the second wire rod 12) constituting the reticulated tube 10 was caught on a peripheral member during the attachment work was performed. Absence of catching was evaluated as "o (good)", and presence of catching was evaluated as "x (poor)". An evaluation result of catching of each reticulated tube 10 on the peripheral member was as in the following table.

TABLE 2

| Total number 2N | 12 | 12 | 8 |
|---|---|---|---|
| Spiral pitch L [mm] | 50 | 100 | 50 |
| Mesh ratio [%] | 46.2 | 55.5 | 49.4 |
| Catching on peripheral member | ○ | ○ | ○ |

With Regard to Protruding of Optical Fiber:

A plurality of types of the reticulated tubes 10 varying in the number n of the optical fibers, the number N (total number 2N) of each of the first wire rods 11 and the second wire rods 12, an inner diameter D of the reticulated tube 10, a pitch P, and a shape of the opening 10A were created. Here, the number of 12-core intermittently connected optical fiber ribbons was 12 or 24, and the number n of the optical fibers was 144 or 288. The number of the first wire rods 11 and the second wire rods 12 was each four (eight in total) or six (12 in total). The inner diameter D of the reticulated tube 10 fell in a range of 6.3 mm to 8.3 mm. The pitch P was 8.3 mm to 45 mm (the spiral pitch was 50 mm to 270 mm). A shape of the openings was a rhombus, and two diagonal lines of the rhombus had different lengths (the table describes a length of a diagonal line along the longitudinal direction (opening length in the longitudinal direction) and a length of a diagonal line along the circumferential direction (opening length in the circumferential direction)).

When each reticulated tube 10 was bent at a flexural radius of 15 mm, presence or absence of protruding of the optical fiber 5 from the opening 10A of the reticulated tube 10 was determined. Furthermore, when the reticulated tube in a bent state was pulled inward (flexural center side), presence or absence of protruding of the optical fiber 5 from the opening 10A of the reticulated tube 10 was determined.

A result of the presence or absence of protruding of the optical fiber in each reticulated tube 10 was as in the following table.

TABLE 3

| Number n of optical fibers | 288 | 288 | 288 | 288 | 144 |
|---|---|---|---|---|---|
| Total number 2N | 12 | 12 | 12 | 12 | 8 |
| Inner diameter D [mm] | 8.3 | 7 | 7.3 | 7 | 6.3 |
| Pitch P [mm] | 8.3 | 17 | 25 | 45 | 12.5 |
| Opening shape | Rhombus | Rhombus | Rhombus | Rhombus | Rhombus |
| Opening length in longitudinal direction | 6 mm | 14 mm | 18 mm | 35 mm | 5 mm |
| Opening length in circumferential direction | 3 mm | 4 mm | 4 mm | 3.5 mm | 3.5 mm |
| Protruding (when bent) | No | No | No | Yes | No |
| Protruding (when pulled) | No | No | Yes | Yes | No |

As illustrated in Table 3, the shorter the opening length in the longitudinal direction, the less likely the optical fiber 5 tended to protrude from the opening 10A of the reticulated tube 10. In a case that a shape of the opening was a rhombus, protruding of the optical fiber 5 when the reticulated tube 10 was bent could be suppressed with the opening length in the longitudinal direction being less than or equal to 18 mm. In a case that a shape of the opening was a rhombus, protruding of the optical fiber 5 when the reticulated tube 10 in a bent state was pulled could also be suppressed with the opening length in the longitudinal direction being less than or equal to 14 mm.

Next, a plurality of types of the reticulated tubes 10 further varying in a shape of the opening 10A were created. Here, the reticulated tube 10 was constituted as one cylindrical member in which many openings 10A were formed, and the openings 10A were formed into a slit shape or a rectangular shape. It should be noted that, in a case of the openings 10A having a slit shape, slits were formed along the longitudinal direction, and a slit width (length of the opening in the circumferential direction) was less than 0.5 mm. It should be noted that a width (dimension of the peripheral part 10B in the circumferential direction) of the peripheral part 10B between the opening 10A and the opening 10A adjacent to each other in the circumferential direction was 4 mm in a case of the openings 10A having a slit shape, and was 2 mm in a case of the openings 10A having a rectangular shape. Similarly to the description above, presence or absence of protruding of the optical fiber 5 from the opening 10A of the reticulated tube 10 when the reticulated tube 10 was bent and when the reticulated tube 10 in a bent state was pulled inward was determined. A result of the presence or absence of protruding of the optical fiber in each reticulated tube 10 was as in the following table.

TABLE 4

| Number n of optical fibers | 288 | 288 | 288 | 288 | 288 | 288 |
|---|---|---|---|---|---|---|
| Inner diameter D [mm] | 8 | 8 | 8 | 8 | 8 | 8 |
| Pitch P [mm] | 12 | 22 | 42 | 12 | 22 | 42 |
| Opening shape | Slit | Slit | Slit | Rectangle | Rectangle | Rectangle |
| Length in extension direction | 10 mm | 20 mm | 40 mm | 10 mm | 20 mm | 40 mm |

TABLE 4-continued

| | | | | | | |
|---|---|---|---|---|---|---|
| Length of opening in circumferential direction | <0.5 mm | <0.5 mm | <0.5 mm | 2 mm | 2 mm | 2 mm |
| Protruding (when bent) | No | No | Yes | No | No | Yes |
| Protruding (when pulled) | No | Yes | Yes | No | Yes | Yes |

As illustrated in Table 3 and Table 4, regardless of a shape of the opening 10A, as the opening length in the longitudinal direction was shorter, the optical fiber 5 tended to be less likely to protrude from the opening 10A of the reticulated tube 10. Protruding of the optical fiber 5 when the reticulated tube 10 was bent could be suppressed with the opening length in the longitudinal direction of the opening 10A being less than or equal to 20 mm. Protruding of the optical fiber 5 when the reticulated tube 10 in a bent state was pulled could also be suppressed with the opening length in the longitudinal direction of the opening 10A being less than or equal to 14 mm.

With Regard to Strength of Branch Part:

A plurality of types of the reticulated tubes 10 varying in the number N (total number 2N) of each of the first wire rods 11 and the second wire rods 12, an inner diameter D of the reticulated tube 10, and a pitch P were created. Here, the number of the first wire rods 11 and the second wire rods 12 was each four (eight in total) or six (12 in total). The inner diameter D of the reticulated tube 10 was 6.3 mm or 8.3 mm. The spiral pitch L was 50 mm.

By applying a tensile force of 180 N to each reticulated tube 10, presence or absence of separation between the first wire rod 11 and the second wire rod 12 of the branch part 10C (the branch part 10C acquired by fusion-bonding at an intersection point of the first wire rod 11 and the second wire rod 12) was determined. A result of the presence or absence of separation of the branch part 10C in each reticulated tube 10 was as in the following table (it was determined that the branch part 10C was not destroyed by the tensile force of 180 N).

TABLE 5

| | | |
|---|---|---|
| Total number 2N | 12 | 8 |
| Inner diameter D [mm] | 8.3 | 6.3 |
| Spiral pitch L [mm] | 50 | 50 |
| Presence or absence of separation | No | No |

With Regard to Bundle of Reticulated Tubes 10:

12 optical fiber units 3 in which 288 optical fibers were inserted through the reticulated tube 10 having an outer diameter of 8.3 mm were prepared, the 12 optical fiber units 3 were bundled, and an outer circumference length of the bundle of the 12 optical fiber units was measured. For comparison, 12 protective tubes (outer diameter of 9.7 mm and wall thickness of 0.7 mm) made of polyethylene through which 288 optical fibers are inserted were prepared, the 12 protective tubes were bundled, and an outer circumference length of the bundle of the 12 protective tubes was measured. It should be noted that a string was wrapped around the outer circumference of the bundled 12 optical fiber units or the outer circumference of the bundled 12 protective tubes, and a length of the string was measured, and thus an outer circumference length of each of the bundles was measured. Since a cross-sectional shape of the optical fiber unit 3 using the reticulated tube 10 was more likely to become deformed than that of the protective tube made of polyethylene, an outer circumference length of the bundle of the 12 protective tubes made of polyethylene was 14 mm, whereas an outer circumference length of the bundle of the 12 optical fiber units 3 using the reticulated tube 10 was 10 mm.

{Others}

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical cable;
1A: First optical cable;
1B: Second optical cable;
3: Optical fiber unit;
3A: First optical fiber unit;
3B: Second optical fiber unit;
5: Optical fiber;
10: Reticulated tube;
10': Silicon tube;
10A: Opening;
10B: Peripheral part;
10C: Branch part;
10X: End part;
11: First wire rod;
12: Second wire rod;
13: Core part;
14: Sheath part;
20: Protective unit;
22: Tubular member;
22A: First end;
22B: Second end;
24: Cylindrical member;
24A: First cylindrical member;
24B: Second cylindrical member;
241: Cylindrical part;
242: Protrusion part;
40: Rack;
41: Housing shelf;
42: Housing tray;
421: Bottom plate part;
422: Side plate part;
423: Front plate part;
424: Rear plate part;
424A: Folded part;
43: Fiber housing part;
431: Holder part;
432: Guide part;
44: Unit housing part;
45: Partition part;

46: Communication part;
47: Holding part;
471: Groove part;
472: Lower claw part;
473: Upper claw part;
48: Fiber housing unit;
50: Branch unit;
51: Body part;
52: First fixing part;
521: Support part;
522: Fastening member;
53: Second fixing part;
53A: Groove;
531: Holding plate;
531A: Recessed part;
54: Housing part;
541: Upstream stopper;
542: Downstream stopper;
57: Lid;
57A: Injection opening.

The invention claimed is:

1. An optical fiber protective unit, comprising:
a reticulated tube having openings that are reticulately formed, wherein the reticulated tube is configured to accommodate a plurality of optical fibers inserted through the reticulated tube;
a tubular member disposed inside the reticulated tube, wherein the tubular member is configured to accommodate the plurality of optical fibers inserted through the tubular member, wherein the plurality of optical fibers is movable with respect to the tubular member; and
a cylindrical member directly attached to an end part of the reticulated tube, wherein the cylindrical member has an inner diameter that is larger than an outer diameter of the tubular member.

2. The optical fiber protective unit according to claim 1, wherein
the reticulated tube is folded in a longitudinal direction and a peripheral part of the openings is bent.

3. The optical fiber protective unit according to claim 1, wherein
the cylindrical member includes a hollow cylindrical part and a protrusion part, and
the protrusion part protrudes outward from an outer periphery of the hollow cylindrical part.

4. The optical fiber protective unit according to claim 1, wherein
the cylindrical member is attached to both ends of the reticulated tube.

5. An optical fiber protective unit, comprising:
a reticulated tube having openings that are reticulately formed, wherein the reticulated tube is configured to accommodate a plurality of optical fibers inserted through the reticulated tube;
a tubular member disposed inside the reticulated tube, wherein the tubular member is configured to accommodate the plurality of optical fibers inserted through the tubular member; and
a cylindrical member directly attached to an end part of the reticulated tube, wherein
the cylindrical member has an inner diameter that is larger than an outer diameter of the tubular member,
the cylindrical member includes a hollow cylindrical part and a protrusion part,
the protrusion part protrudes outward from an outer periphery of the hollow cylindrical part, and
the end part of the reticulated tube is hooked on the protrusion part.

6. The optical fiber protective unit according to claim 5, wherein
irregularities are formed on an edge of the protrusion part.

7. An optical fiber protective unit, comprising:
a reticulated tube having openings that are reticulately formed, wherein the reticulated tube is configured to accommodate a plurality of optical fibers inserted through the reticulated tube;
a tubular member disposed inside the reticulated tube, wherein the tubular member is configured to accommodate the plurality of optical fibers inserted through the tubular member; and
a cylindrical member directly attached to an end part of the reticulated tube, wherein
the cylindrical member has an inner diameter that is larger than an outer diameter of the tubular member,
the cylindrical member includes a hollow cylindrical part and a protrusion part,
the protrusion part protrudes outward from an outer periphery of the hollow cylindrical part,
the protrusion part fits into a groove of an external member, and
the end part of the reticulated tube is fixed to the external member by inserting the protrusion part into the groove.

8. A method for manufacturing an optical fiber unit, the method comprising:
preparing a protective unit including a reticulated tube folded in a longitudinal direction, a tubular member inserted through the reticulated tube, and a cylindrical member attached to an end part of the reticulated tube;
inserting a plurality of optical fibers through an inside of the folded reticulated tube by inserting the optical fibers into the tubular member; and
extending the folded reticulated tube in the longitudinal direction by pulling out the cylindrical member from the tubular member, and inserting the plurality of optical fibers through the inside of the extended reticulated tube.

9. A method for manufacturing an optical fiber unit according to claim 8, further comprising:
withdrawing the tubular member from the reticulated tube after the plurality of optical fibers have been inserted through the tubular member.

10. An optical fiber protective unit, comprising:
a reticulated tube having openings that are reticulately formed, wherein the reticulated tube is configured to accommodate a plurality of optical fibers inserted through the reticulated tube;
a tubular member disposed inside the reticulated tube, wherein the tubular member is configured to accommodate the plurality of optical fibers inserted through the tubular member; and
a cylindrical member directly attached to an end part of the reticulated tube, wherein
the cylindrical member has an inner diameter that is larger than an outer diameter of the tubular member, and
the tubular member is movable with respect to the cylindrical member.

* * * * *